(12) United States Patent
Kataoka

(10) Patent No.: US 7,382,468 B2
(45) Date of Patent: Jun. 3, 2008

(54) INTERFEROMETER SYSTEM, SIGNAL PROCESSING METHOD IN INTERFEROMETER SYSTEM, AND STAGE USING SIGNAL PROCESSING

(75) Inventor: Yoshinori Kataoka, Saitama (JP)

(73) Assignee: Nikon Corporation, Tokyo (JP)

( * ) Notice: Subject to any disclaimer, the term of this patent is extended or adjusted under 35 U.S.C. 154(b) by 61 days.

(21) Appl. No.: 11/252,752

(22) Filed: Oct. 19, 2005

(65) Prior Publication Data

US 2006/0114468 A1 Jun. 1, 2006

Related U.S. Application Data

(63) Continuation of application No. PCT/JP2004/005713, filed on Apr. 21, 2004.

(30) Foreign Application Priority Data

Apr. 23, 2003 (JP) ............................ P2003-118359

(51) Int. Cl.
*G01B 11/02* (2006.01)
(52) U.S. Cl. ...................................... 356/498; 356/500
(58) Field of Classification Search ................ 356/486, 356/487, 493, 498, 500
See application file for complete search history.

(56) References Cited

U.S. PATENT DOCUMENTS 3,627,996 A * 12/1971 Vigour ........................... 377/3

3,798,557 A * 3/1974 Scott et al. ...................... 327/3
5,347,355 A * 9/1994 Eguchi ......................... 356/498
6,218,870 B1 * 4/2001 Wilson ........................... 327/34
6,975,406 B2 * 12/2005 Demarest ..................... 356/500

FOREIGN PATENT DOCUMENTS

| JP | A 54-139367 | 10/1979 |
|---|---|---|
| JP | A 61-288514 | 12/1986 |
| JP | A 2-209035 | 8/1990 |
| JP | A 10-97982 | 4/1998 |
| JP | A 11-194479 | 7/1999 |
| JP | A 2000-12453 | 1/2000 |
| JP | A 2000-29202 | 1/2000 |
| JP | A 2000-49066 | 2/2000 |
| JP | A 2001-94401 | 4/2001 |
| JP | A 2001-513267 | 8/2001 |
| WO | WO 99/32940 | 7/1999 |
| WO | WO 99/34255 | 7/1999 |
| WO | WO 99/50712 | 10/1999 |
| WO | WO 99/66370 | 12/1999 |

* cited by examiner

*Primary Examiner*—Patrick J Connolly
(74) *Attorney, Agent, or Firm*—Oliff & Berridge, PLC

(57) ABSTRACT

A method for processing a signal in an interferometer system that measures position information of an object under measurement based on reflected light obtained by directing a measurement light onto the object under measurement, includes a delaying step of obtaining a delayed signal by causing a delay of a prescribed number of periods with respect to a prescribed signal; a synthesizing step of obtain a synthesized signal of the prescribed signal and the delayed signal; and a measuring step of measuring position information of the object under measurement using the synthesized signal.

19 Claims, 21 Drawing Sheets

US 7,382,468 B2

INTERFEROMETER SYSTEM, SIGNAL PROCESSING METHOD IN INTERFEROMETER SYSTEM, AND STAGE USING SIGNAL PROCESSING

CROSS-REFERENCE TO RELATED APPLICATION

This is a Continuation application of International Application No. PCT/JP2004/005713, filed Apr. 21, 2004, which claims priority to Japanese Patent Application No. 2003-118359, filed Apr. 23, 2003. The contents of the aforementioned applications are incorporated herein by reference.

BACKGROUND OF THE INVENTION

1. Field of the Invention

The present invention relates to an interferometer system and interferometer system processing method whereby information position of an object under measurement is detected by detecting light reflected by direct measurement light having a high coherency onto the object under measurement, and also to a method for signal processing and a stage that measures the position of a moving object using a signal processing method.

2. Description of Related Art

An interferometer system is used to measure the position information of an object under measurement by directing a measurement light having high coherency, such as a laser beam or light, onto the object to be measured and detecting the reflected light, and has a high resolution such as 1 nm. For this reason, a laser interferometer is provided in an exposure apparatus that transfers a pattern onto a mask for manufacture of semiconductor element liquid-crystal elements, magnetic heads, or other microdevices, or it is provided transfers a pattern onto a glass plate, and is used to measure the position information of a stage which causes the mask or substrate to move.

An interferometer system has a light source that emits high-coherency light, and divides the high-coherency light emitted by the light source into a plurality of parts, one thereof being used as the above-noted measurement light. For example, in an interferometer system provided in an exposure apparatus, the high-coherency light from a light source is divided into three, these being used as the above-noted measurement light, a reference light which is directed onto a fixed mirror that establishes a reference position with respect to the above-noted stage, and a reference light for establishing a reference light path that has a known light path link for the purpose of obtaining position information of the stage.

The stage position information is measured by directing measurement light onto a moving mirror provided on the stage and causing interference between the obtained reflected light and the referenced light reflected from the fixed mirror, the interference light being detected by a receiver and a comparison being made between the detection signal obtained from the receiver and the reference signal obtained by detecting the reference light using a reference receiver via the reference light path. The detection signal of the receiver for the purpose of measuring the position information and the reference signal of the reference receiver are both digitized (converted to binary form), and when noise is superimposed on either the detection signal or the reference signal, there is a sudden change in the period of the signal (a so-called glitch), which causes a reduction in the measurement accuracy of the position information. In order to prevent such problems, there has been disclosed, in Japanese Unexamined Patent Application, First Publication No. 2001-94401, a glitch-reduction circuit that reduces glitches when a detection signal is digitized.

The above-noted glitch-reduction circuit reduces the glitch occurring upon digitization of the detection signal or reference detection signal, but does not completely eliminate the glitch at the point in time of the digitization. For this reason, the phenomenon of a sudden variation of the pulse width of a digital signal that is converted and the phenomenon of a sudden loss of the pulse for one or more periods still occurs. When these phenomena occur, an error occurs leading to the problem of a loss in accuracy of measurement of the position information.

In recent years, there has arisen a demand for reduced design rules in order to increase the density of device manufacturing. In particular in the manufacture of semiconductor elements, the process rule is tending to be reduced to approximately 0.1 µm, and there is an extreme degree of precision that is required in overlapping patterns to be exposed onto a substrate with patterns that have already been formed thereon. In order to improve the precision of overlaying, it is first necessary to measure the position information of the stage with high accuracy, and for this reason, it is necessary to avoid measurement errors that are caused by noise as much as possible.

SUMMARY OF THE INVENTION

The present invention was made in consideration of the above-noted situation, and has as an object to provide an interferometer system, and also to provide a method for signal processing in an interferometer system and a stage that measures the position of a moving object using a signal processing method.

A first aspect of the present invention is a method for processing a signal in an interferometer system that measures position information of an object under measurement based on reflected light obtained by directing a measurement light onto the object under measurement, the method including: a delaying step of obtaining a delayed signal by causing a delay of a prescribed number of periods with respect to a prescribed signal; a synthesizing step of obtaining a synthesized signal of the prescribed signal and the delayed signal; and a measuring step of measuring position information of the object under measurement using the synthesized signal.

According to the present invention, a delayed signal is generated that is delayed by a prescribed number of periods with respect to a pre bed signal, and because the position information of the object under measurement is measured by obtaining a synthesized signal from the delayed signal and the prescribed signal, even if the prescribed signal has a part, the missing part of the original prescribed signal is complemented by the synthesized signal obtained by synthesis. Because the synthesized signal with the complemented missing part is used as the basis for measuring the position information of the object under measurement, it is possible to obtain position information of the object under measurement with high accuracy.

A feature of the first aspect of the signal processing method of the present invention is that it includes a processing step of slightly reducing the time width of the delayed signal.

According to this present invention, by slightly reducing the time width of the delayed signal, when complementing the detection signal synthesized from the detection signal and the delayed signal, the detection signal is given priority, so that the detection signal is complemented so as to leave the waveform of the detection signal as much as possible, so that it is possible to minimize the error cases by the missing part of the detection signal. This is a great advantage in measuring the position information of the object under measurement with high accuracy.

A feature of the signal processing method of the first aspect of the present invention is that it includes an averaging step of aver the time width of the synthesized signal.

According to this invention, because the time width of the synthesized signal is averaged, it is possible to measure the position information of the object under measurement with further improved accuracy.

A second aspect of the present invention is a method for processing a signal in an interferometer system that measures position information of an object under measurement based on reflected light obtained by directing a measurement light onto the object under measurement, the method including: a first step of digitizing a prescribed signal; a second step of delaying the prescribed signal digitized byte first step by a prescribed number of periods to obtain a delayed signal; a third step of logically synthesizing the prescribed signal digitized by the first step and the delayed signal; and a fourth step of using the signal obtained by logical synthesis in the third step to obtain position information of the object under measurement.

According to this invention, similar to the case of the first aspect of the present invention, because a delayed signal is generated that is delayed by a prescribed number of periods with respect to a prescribed signal and the position information of the object under measurement is measured by obtaining a synthesized signal from the delayed signal and the prescribed signal, even if the prescribed signal has a missing part, the missing part of the original prescribed signal is complemented by the synthesized signal obtained by synthesis. As a result, it is possible to obtain position information of the object under measurement with high accuracy.

In the signal processing method in the interferometer system according to either the first or the second aspect of the present invention, the prescribed signal is a detection signal obtained by detecting an interference light that is generated by causing interference between the reflected light and a reference light, or a reference signal that is compared with a detection signal obtained by detecting an interference light that is generated by causing interference between the reflected light and a reference light, in order to obtain position information of the object under measurement.

A stage according to the present invention includes: a moving body configured so as to be movable in a prescribed direction; an interferometer system using the above-noted signal processing method, for processing a signal to measure position information of the moving body as an object under measurement; and a drive controller that drives the moving body based on a measurement result from the interferometer system.

According to this invention, it is possible to measure the position information of the moving body with high accuracy, and because the moving body is driven based on these high-accuracy measurement results, it is possible to perform precise drive of the moving body.

An interferometer system of the present invention includes: a reference mechanism that outputs a reference signal; and a receiver that outputs a detection signal obtained by causing interference between reflected light obtained by directing a measurement light onto the object under measurement and a reference light, wherein the reference mechanism performs complementing processing of a digitally processed signal and outputs the signal as the reference signal after the complementing processing, and wherein position information of the object under measurement is measured based on the reference signal obtained from the reference mechanism and the detection signal from the receiver.

According to this invention, because the reference mechanism does not use reflected light from the object under measurement, which is the moving body, it easier to generate the optimum complimented reference signal, without the influence of Doppler effect, making it possible to measure the position information of the object under measurement with high accuracy.

Because the present invention is a signal processing method in an interferometer system that measures the position information of an object under measurement based on reflected light obtained by directing measurement light onto the object under measurement, and includes a delaying step of obtaining a delayed signal that is delayed a prescribed number of periods with respect to prescribed signal, a synthesizing step of obtaining a synthesized signal by synthesis of the prescribed signal and the delayed signal, and a measuring step of using the synthesized signal to measure the position information of the object under measurement, a delayed signal is generated that is delayed by a prescribed number of periods relative to a prescribed signal, and the position information of the object under measurement is measured by a synthesized signal obtained by synthesis of the delayed signal and the prescribed signal, so that even if the original prescribed signal has a missing part, the missing part in the original prescribed signal is complemented in the synthesized signal. Because the synthesized signal, in which the missing part of the original prescribed signal is complemented, is used as the basis for measurement of the position information of the object under measurement, it is possible to obtain the position information of the object under measurement with high accuracy.

DETAILED DESCRIPTION OF THE INVENTION

Preferred embodiments of the preset invention are described in detail below, with references made to the accompanying drawings.

(Interferometer System)

Figure 1:
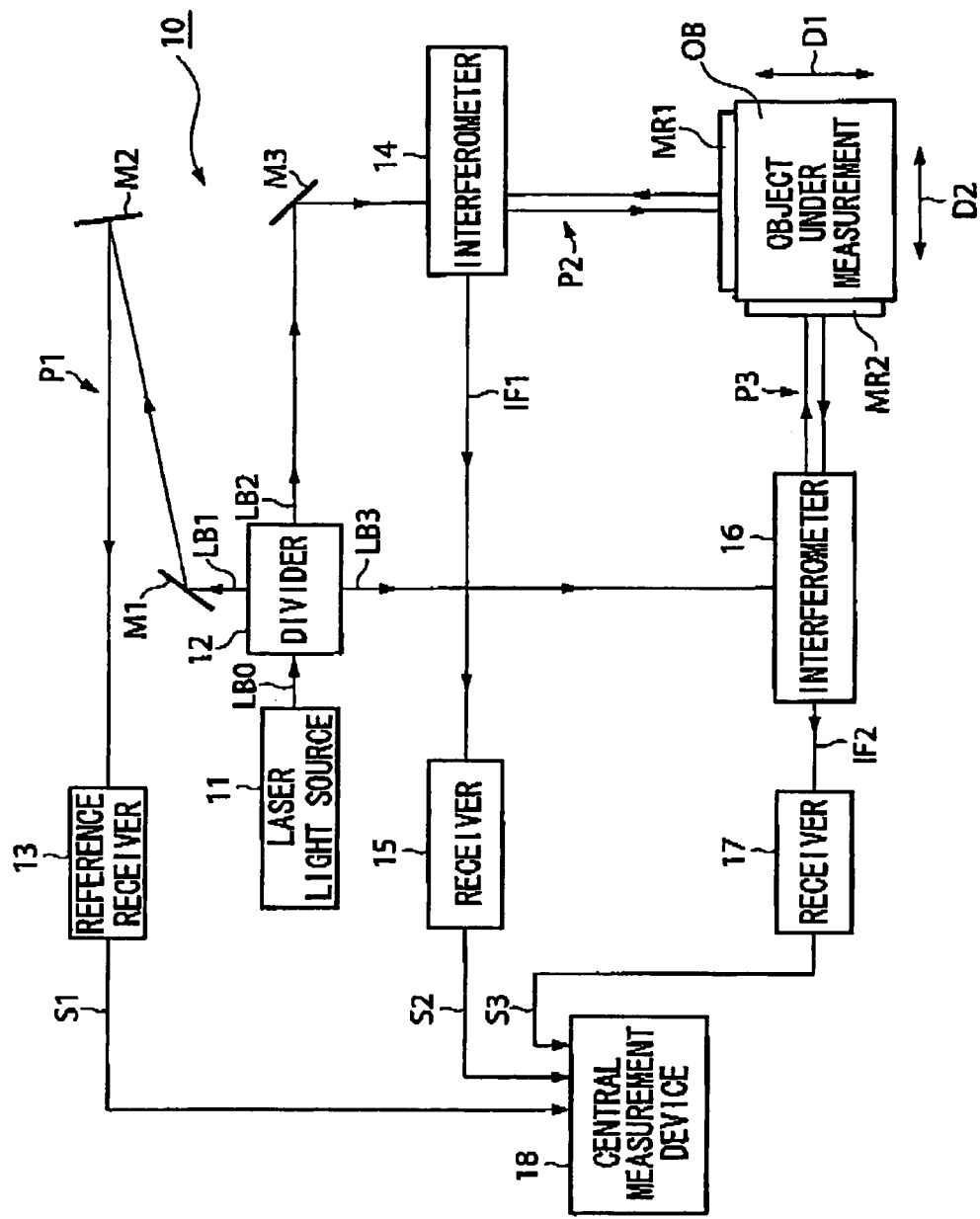
FIG. 1 is a block diagram showing the general configuration of an interferometer system in which a signal processing method according to an embodiment of the present invention is used.

FIG. 1 is a block diagram showing the general configuration of an interferometer system in which a signal processing method according to an embodiment of the present invention is used.

The interferometer system 10 shown in FIG. 1 can be generally described in that laser light LB0 emitted from the laser light source 11 is divided into the three laser lights LB1 to LB3, one of the divided laser lights, LB1, passing through a reference light path P1 having a known light path length and being received so as to obtain the reference S1. The other two divided laser lights LB2 and LB3 are caused to strike the object under measurement and obtain detection signal S2 and S3 by receiving the resulting interference light, the position information of the object under measurement being measured from the reference signal S1 and the detection signals S2 and S3. The specific configuration is described below.

The laser light source 11 emits laser light LB0, which includes light of two different wavelengths, $\lambda 1$ and $\lambda 2$. This laser light enters the divider 12, and is divided into the three laser lights LB1 to LB3. One of the divided laser lights LB1 is reflected in sequence by reflecting mirror M1 and then M2, as it passes through the reference light path P1 and strikes the reference receiver 13. At this point because the laser light LB1 includes the two different wavelengths $\lambda 1$ and $\lambda 2$, the interference between these enters the reference receiver 13. The reference receiver 13 performs an opto-electric conversion of the interference light the two different wavelengths $\lambda 1$ and $\lambda 2$, and generates a reference signal, which is digitized (into binary form) by step 1, and subjected to glitch reduction processing. This processing subjects the signal to complementing for pulse width jitter and missing pulses (the signal processing of the present invention) and outputs the reference signal S1.

The laser light LB2 divided out by the divider 12 is reflected by the reflecting mirror M3, and enters the interferometer system 14 The laser light LB2 that enters the interferometer system 14 includes two different wavelengths, $\lambda 1$ and $\lambda 2$, and laser light of one of the wavelengths (for example laser light of the wavelength $\lambda 1$) passes through the light path P2 and is reflected at the reflecting mirror MR1 that is mounted to the object under measurement, after which it travels in the reverse direction through light path P2 and enters the interferometer system 14. The laser light of the other wavelength (for example laser light of wavelength $\lambda 1$) strikes a fixed mirror that is not illustrated, and the resulting reflected light strikes the interferometer system 14. Also, the object under measurement OB shown in FIG. 1 is configured so as to enable movement in two mutually perpendicular directions, D1 and D2, within the plane of the drawing.

The interferometer system 14 causes interference between the laser light of wavelength $\lambda 1$ that passes through the light path P2 and the laser light of wavelength $\lambda 1$ reflected from the not-illustrated fixed mirror. The interference light IF1 obtained at the interferometer system 14 exits from the interferometer system 14 and strikes the receiver 15. The receiver 15 performs an opto-electrical conversion on the interference light IF to generate a detection signal, digitizes (converts to binary) this detection signal (first step), and performs glitch reduction processing. This processing subjects the signal to complementing for pulse width jitter and missing pulses (the signal processing of the present invention) and output the reference signal S2.

The laser light LB3 divided by the divider 12 strikes interferometer system 16. The laser light LB3 that strikes the interferometer system 16 includes two different wavelengths, $\lambda 1$ and $\lambda 2$, and laser light of one of the wavelengths (for example, laser light of the wavelength $\lambda 1$) passes through the light path LP3 and is reflected at the reflecting mirror MR2 mounted to the object under measurement, after which it travels in the reverse direction through tee light path P3 and strikes the interferometer system 16. The laser light of the other wavelength (for example, laser light of wavelength $\lambda 2$) strikes a fixed mirror that is not illustrated, and the resulting reflected light strikes the interferometer system 16.

The interferometer system 16 causes interference between the laser light of wavelengths $\lambda 1$ that passed through light path P3 and the laser light of wavelength $\lambda 2$ that is reflected from the fixed mirror. The interference light IF obtained by the interferometer system 16 exits the interferometer system 16 and strikes the receiver 17. The receiver 17 performs an opto-electrical conversion on the interference light IF2 and generates a detection signal, digitizes (converts to binary) this detection signal (first step) and performs glitch reduction processing. This processing subjects the signal to complementing for pulse width jitter and missing pulses (the signal processing of the present invention) and outputs the reference signal S3.

The reference signal S1 from the reference receiver 13, the detection signal S2 from the receiver 15, and the detection signal S3 from the receiver 17 are input to the central measurement device 18. The central measurement device 18 compares the reference signal S1 with the detection signal S2 to measure the position information of the object under measurement and compares the reference signal S1 with the detection signal S3 to measure the position information of the object under measurement OB in the direction D2. The above-described processing is performed by the interferometer system shown in FIG. 1 to measure the position information of the object under measurement OB within the plane of the paper (the fourth, measurement, step).

(Signal Processing Apparatus and Signal Processing Method)

The above is a description of an overall interferometer system and what follows is a description of the signal processing apparatus and signal processing method provided in the reference receiver 13 and receivers 15 and 17. Because the configurations of the signal processing apparatus provided in the reference receiver 13 and receivers 15 and 17 are similar, the configuration of the receiver 15 is presented below as being a representative configuration, the description of the configurations of the reference receiver 13 and receiver 17 being omitted.

First Embodiment

Figure 2:
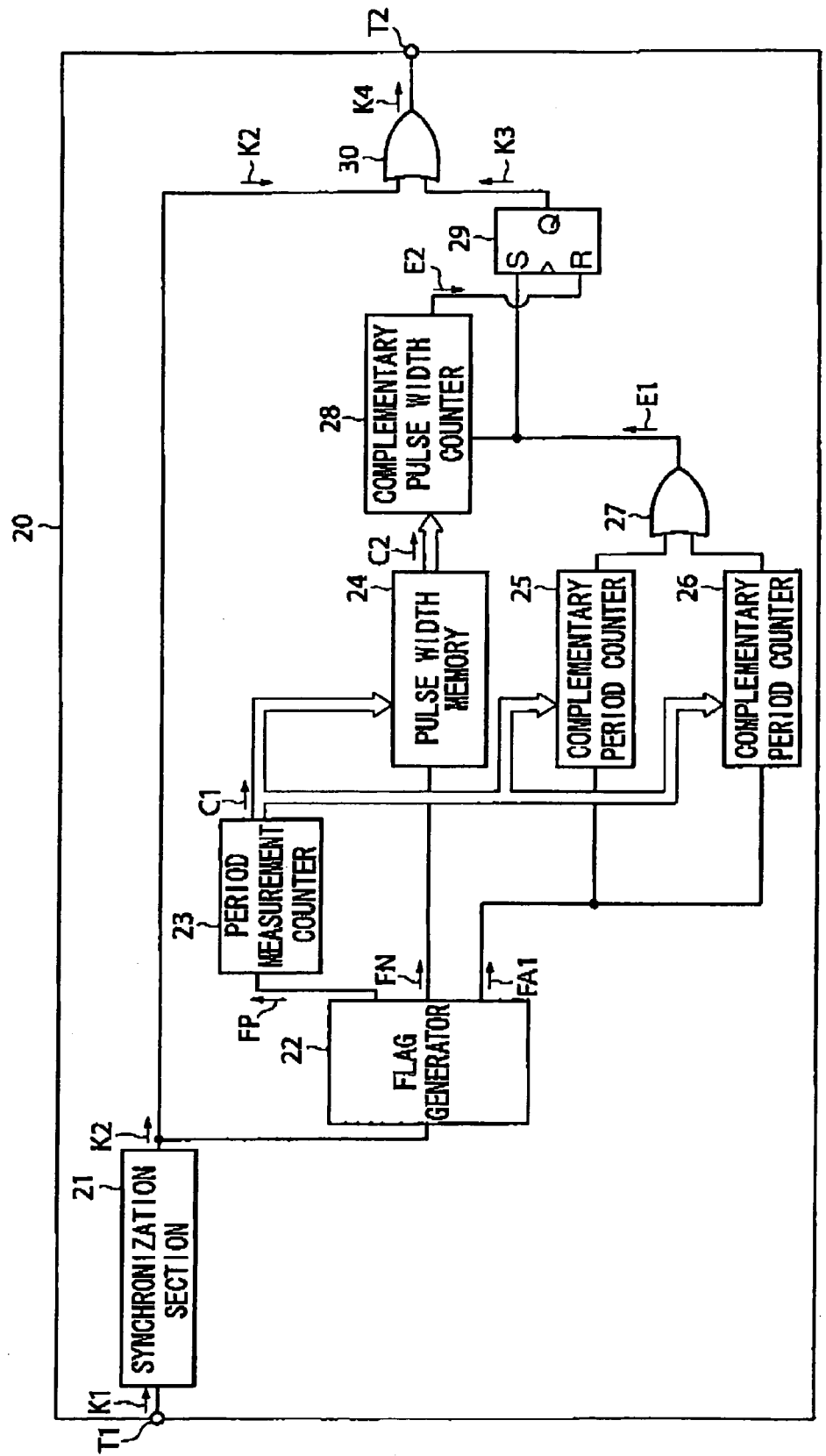
FIG. 2 is a block diagram showing the configuration of a signal processor in which a signal processing method according to a first embodiment of the present invention is used.

FIG. 2 is a block diagram of the configuration of a signal processing apparatus in which the signal processing method according to the first embodiment of the present invention is used.

The signal processing apparatus 20 shown in FIG. 2, is a signal processing apparatus that perform signal processing to complement sudden changes in pulse width and missing pules in a detection signal that is input to the input terminal T1 and digitized (the digitized reference signal in the case of the reference receiver 13). The detection signal input to the terminal T1 is described below.

Figure 3:
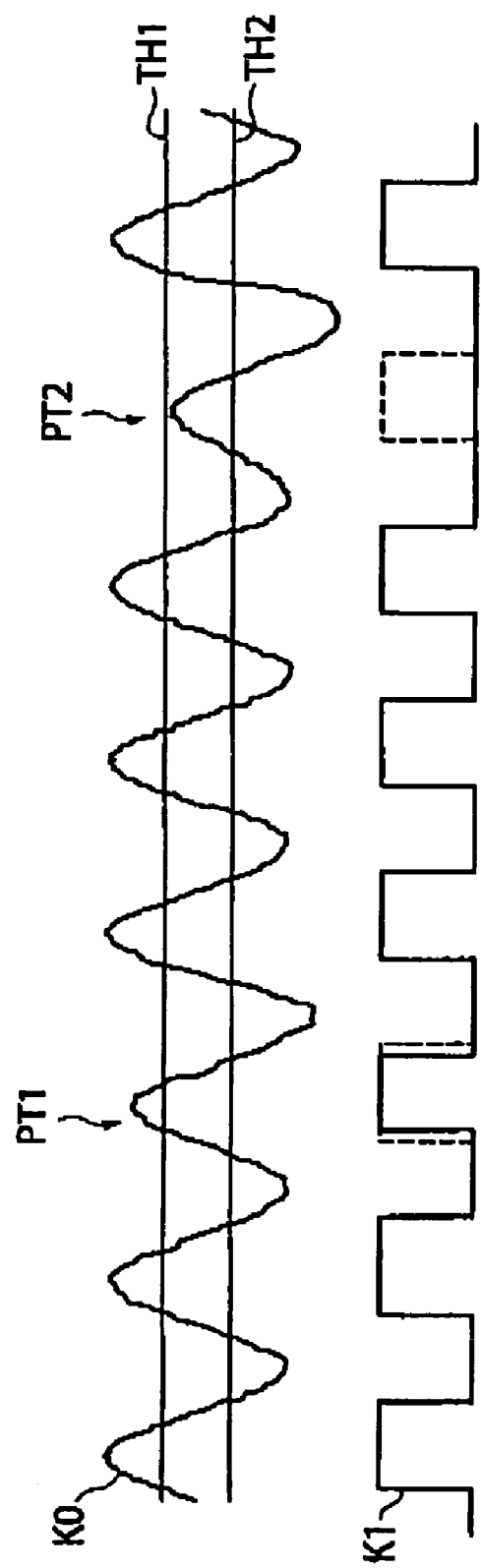
FIG. 3 is a drawing showing an example of a detection signal that is input to an input Terminal of a signal processor.

FIG. 3 is a drawing showing an example of a detection signal input to the input terminal T1 of the signal processing apparatus.

In FIG. 3, the signal marked K0 is the detection signal obtained by performing an opto-electrical conversion of the interference light IF1 within the receiver 15, and the signal marked K1 is the detection signal obtained by digitizing the detection signal K0 and subjecting it to glitch reduction processing. The detection signal K1 is input to the input terminal T1 of the signal processing apparatus 20. The detection signals K0 and Detection signal K1 correspond to the prescribed signal as the term is used in the present invention.

The basic processing to obtain detection signal K1 from detection signal K0 is the setting of two different threshold values TH1 and TH2 with respect to the detection signal K0, and making the "1" in the case in which the value of the detection signal K0 value exceeds the threshold value TH1 and "0" when the value of the detection signal K0 exceeds the threshold value TH2. Simultaneously with this processing, glitch reduction in accordance with the above-described patent document is performed to reduce glitches.

If, for example at the location marked PT1 in the drawing, one pulse of the detection signal K0 exceeds the threshold value TH1 but in the case in which the value is overall value is small compared with other pulses, the phenomenon that occurs is one in which there is a sudden narrowing of the pulse width of the obtained detection signal K1. If, for example at the location marked PT2 in the drawing, the value of one pulse of the detection signal K1 becomes very small, so that it does not exceed the threshold value TH1, the phenomenon occurs of a missing pulse in the detection signal K1 at that location. This detection signal K1 is input to the input terminal T1 of the signal processing apparatus 20. The frequency of the detection signal K1 input to the input terminal T1 is approximately 3.5 MHz to 6.5 MHz, and the duty cycle (time ratio of the time during one period when the value is "0" to the time during one period when the value is "1") is 50%.

Returning to FIG. 2, the signal processing apparatus 20 of this embodiment has a configuration that includes a synchronization section 21, a flag generator 22, period measurement counter 23, pulse width memory 24, complementary period counters 25 and 26, a logical summing circuit 27 (hereinafter referred to as an OR circuit), an RF flip-flop circuit 29, and an OR circuit 30. Each of the blocks in the signal processing apparatus 20 is supplied with a reference clock CLK (not shown in FIG. 2) having a frequency of approximately 200 MHz, and other clocks are synchronized to this clock.

The synchronization section 21 generates a synchronous detection signal by synchrony the detection signal K1 that is input via the input terminal T1 (refer to FIG. 2) to the reface clock CLK. This synchronized detection signal K2 also corresponds to the predescribed signal as the term is used in the preset invention. The flag generator 22 generates flags FP, FN, and FA1 that indicate state changes in the synchronized detection signal K2, based on the synchronized detection signal K2 that is output from the synchronization section 21. Of these, the flag FP is a flag that takes the value of "1" only at the time of the rising edge of the synchronized detection signal K2, the flag FN is a flag that takes the value of "1" only at the time of the failing edge of the synchronized detection signal K2, and the flag FA1 is a flag, that changes value (alternately between "1" and "0") each time the flag FP is output.

The period measurement counter 23 is a counter that uses the flag BP output from the flag generator 22 to measure the length of each period of the synchronized detection signal K2. That is, the period measurement counter 23 starts counting (increments) in synchronization with the reference clock CLK at the time the flag FP is output from the flag generator flag generator 22, stops counting and reset (sets the value to "0") at the time the next flag FP is output, and then starts counting again, repeating this operation. The product of the count value C1 at the time the period measurement counter 23 stops counting and the length of one period of the reference clock CLK, (5 ns in the case in which the frequency of the reference clock is 200 MHz) is the length of one period of the synchronized detection signal K2.

The pulse width memory 24 uses the flag FN that is output from the flag generator 22 to store the pulse width of the synchronized detection signal K2 (time during which the value of the synchronized detection signal K2 is "1"). By capturing (latching) the count value C1 of the period measurement counter 23 at the time the flag FN is output from the period measurement counter 23, the pulse width memory 24 measures the pulse width of the synchronized detection signal K2. That is, because the period measurement counter 23 counts from the time of the rising edge of the synchronized detection signal K2 by using the flag FP, it is possible to obtain the pulse width by capturing the count value C1 of the period measurement counter 23 based on the flag FN, which is output at the time of the falling edge of the synchronized detection signal K2.

The pulse width memory 24 captures the count value C1 of the period measurement counter 23 each time the flag FN is output from the flag generator 22. For this reason, in the case in which one period of the synchronized detection signal K2 is defined as the time from the rising edge to the filling edge of the synchronized detection signal K2, the period of time a count value C1 captured one time by the pulse width memory 24 is stored is the period of time from the start of the second half period at which the count value C1 is captured until the end of the first half period of the next period.

The complementary period counters 25 and 26 use the flag FA1 that is output from the flag generator 22 to delay each period of the synchronized detection signal K2 by a prescribed period (one period in the case of this embodiment), thereby establishing the time position of each period of the delayed complementary signal K3. While details will be presented below, it should be noted that, in this embodiment the complement signal K3 is not derived by delaying the synchronized detection signal K2 by one period, completely maintaining the waveshape thereof, but rather is a signal that can perform complementing for pulse width jitter and missing pulses in the detection signal K1 shown in FIG. 3. Naturally, it is alternatively possible to use a circuit configuration which generates the complementary signal K3 by delaying the synchronized detection signal K2 by a prescribed period while completely maintaining its waveform. The complementary signal K3 corresponds to the delayed signal as the term is used in the present invention.

The complementary period counter 25 captures the count value C1 of the period measurement counter 23 at the falling edge of the flag FA1, the captured count value being decremented in synchronization with the reference clock CLK, and the counting stopped when the count value reaches "0", at which point a counting end pulse signal is output. The complementary period counter 26 captures the count value C1 of the period measurement counter 23 at the edge of the flag FA1, and decrements the captured count value in synchronization with the reference clock CLK, until the count value reaches "0", at which point the counting is stopped and a counting end pulse signal is output. The reason for providing the complementary period counters 25 and 26 in parallel is in order to cause each to operate in alternating fashion, so that each period of the complementary signal K3 can be made continuous, with no breaks.

The OR circuit 27 takes the logical OR of the counting end pulse signals output from the complementary period counters 25 and 26, and outputs the complementary period end signal E1. This complementary period end signal E1 is output to the complementary pulse width counter 28 and the RS flip-flop circuit 29. The complement pulse width counter 28 captures the count value C2 stored in the pulse width memory 24 at the point in time that the complementary period end signal E1 is output, decrements the captured count value in synchronization with the reference clock CLK until the count value reaches "0", at which point the counting stops and a counting end pulse signal E2 is output.

The RS flip-flop circuit 29 has input to its S (set) input terminal the complementary period end signal E1 and to its R (reset) input terminal the counting end pulse signal E2, and generates the complementary signal K3 which is delayed by just one period from the synchronized detection signal K2, based on these signals. The RS flip-flop circuit 29 output terminal Q is "1" when the complementary period end signal E1 is input, and "0" when the counting end pulse signal E2 is input, thereby generating the synchronized detection signal Complementary signal K3.

The OR circuit 30 has input to one of its input terminals the synchronized detection signal K2 output from the synchronization section 21 and to its other input terminal the complementary signal K3. The OR circuit 30 logically sums the synchronous detection signal K2 and the complementary signal K3 to generate the complementary detection signal K4. This complementary detection signal K4 is output as the detection signal S2 from the output terminal T2. The complementary detection signal K4 corresponds to the synthesized signal as the term is used in the present invention.

Next the operation of the signal processing apparatus 20 having the above-noted configuration, that is, the signal processing method according to the first embodiment of the present invention is described below.

Figure 4:
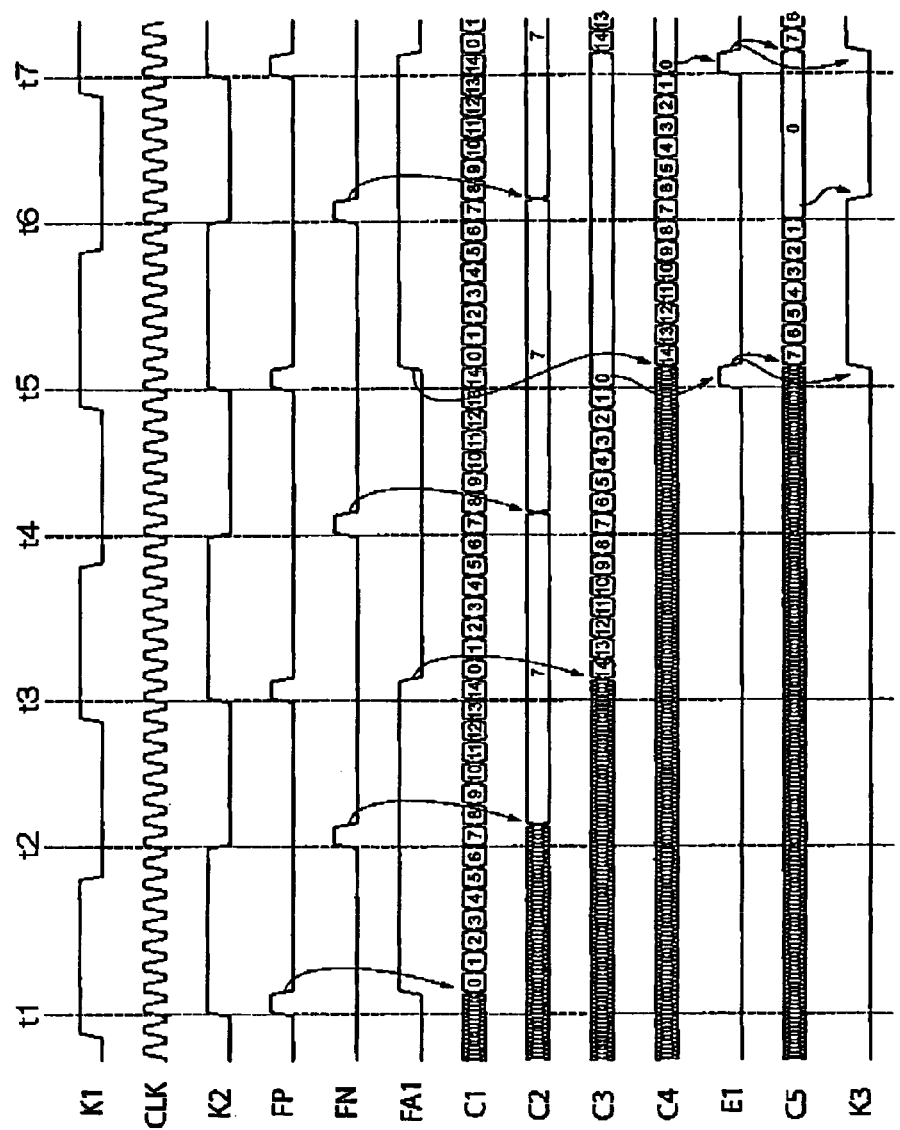
FIG. 4 is a timing diagram showing a signal processing method according to the first embodiment of the present invention.

FIG. 4 is a timing diagram showing the signal processing method according to the first embodiment of the present invention. The detection signal K1 shown in FIG. 4 is a detection signal that is input to the input terminal T1 of the signal processing apparatus 20 shown in FIG. 2, and the reference clock CLK is a reference clock that is input to each block of the signal processing apparatus 20. In FIG. 4, the times at which the state of the synchronous detection signal K2 changes are the times ti to t7. In FIG. 4 C3 and C4 represent the count values of the complementary period counters 25 and 26, and C5 represents the count value of the complementary pulse width counter 28.

When the detection signal K1 is input at the input terminal T1, the detection signal K1 is input to the synchronization section 21, at which it is synchronized with the reference clock CLK so as to generate the synchronous detection signal K2. This synchronous detection signal K2 is output to the flag generator 22 and to the OR circuit 30. When the synchronous detection signal K2 is input to the flag generator 22, the flags FP, FN, and FA1 are generated in accordance with the state changes of the synchronous detection signal K2.

For example, at time t1 in FIG. 4 at which there is a rising edge of the synchronous detection signal K2, the flag FP is output from the flag generator 22. When the flag FP is output (more precisely, at the filling edge of the flag FP), the period measurement counter 23 state is reset and starts counting (incrementing), thereby increasing the count value C1 in synchronization with the reference clock CLK. During the time when the period measurement counter 23 is measuring, when the time t2 is reached, the flag FN is output from the flag generator 22. When the flag FN is output (more precisely, at the falling edge of the flag FN), the pule width memory 24 captures the count value C1 of the period measurement counter 23 (the value "7" in the example shown in FIG. 4) and stores this as the count value C2. At this point, the count value C2 captured in the pulse width memory 24 is a value that indicates the time between the time t1 and the time t2 during which the synchronous detection signal K2 value is "1".

When the period measurement counter 23 continues counting and the time t3 is read the flag FP is output from the flag generator 22, and the flag FA1 falls. The complementary period counter 25 captures the count value C1 at the time that the flag FA1 falls (the value "14" in the example shown in FIG. 4), and starts to decrement the count value C1 captured in synchronization with the reference clock CLK (refer to the count value C3 in FIG. 4). At this point the count value C1 captured by the complementary period counter 25 is a value that indicates the length of one period of the synchronous detection signal K2, between time t1 and time t3.

Based on the flag FP, which is output from the flag generator 22 at time t3, period measurement counter 23 resets and starts counting (incrementing). The above described processing of the pulse width memory 24 capturing the count value C1 of the period measurement counter period measurement counter 23, the processing of the complementary period counters 25 and 26 capturing the count value C1 of the period measurement counter 23, and subsequent processing in the same manner correspond to the processing of the fifth step in the present invention.

When the time t3 has elapsed, the period measurement counter 23 goes into the incrementing state (refer to the count value C1), and the complementary period counter 25 goes into the state of decrementing the count value C1 that is captured at time t3 (refer to the count value C3). In this state, when the time t4 is reached the flag FN is output from the flag generator 22, this flag FN causing the pulse width memory 24 to capture the count value C1 of the period measurement counter 23 (the value "7" in the example shown in FIG. 4) as the count value C2. At this point, the value captured by the pulse width memory 24 is the pulse width of the synchronized detection signal Synchronous detection signal K2 between time t3 and time t4.

When further time elapses and the time t5 is reached, the flag FP is output from the flag generator 22 and the flag FA1 falls. The complementary period counter 26 captures the count value C1 of the period measurement counter 23 at the time of the rising edge of the flag FA1 (the value "14" in the example shown in FIG. 4), and starts to decrement the captured value in synchronization with the reference clock CLK (refer to the count value C4 in FIG. 4). At this point the value captured by the complementary period counter 25 is a value indicating the length of one period of the synchronized detection signal Synchronous detection signal K2 between time t3 and time t5.

At the time t5, the count value C3 of the complementary period counter 25 becomes "0", and a counting end pulse signal is output from the complementary period counter 25. The count pulse signal is logically summed by the OR circuit 27 with the counting end pulse signal output from the complementary period counter 26 and output as the complementary period end signal E1 to the complementary pulse width counter 28 and the RS flip-flop circuit 29. When the complementary period end signal E1 is input to the RS flip-flop circuit 29 (more precisely, at the falling edge of the complementary period end signal E), the Q output of the RS flip-flop circuit 29 changes to "1" and the complementary signal K3 rises.

When the complementary period end signal E1 from the OR circuit 27 is output to the complementary pulse width counter 28 (more precisely, at the filling edge of the complementary period end signal E1), the complementary pulse width counter 28 captures the count value C2 stored in the pulse width memory 24 (the value "7" in the example shown in FIG. 4) and starts to decrement it in synchronization with the reference clock CLK (refer to the count value C5 in FIG. 4). When time t5 is passed, the period measurement counter 23 performs an incrementing operation (refer to the count value C1), the complementary period counter 26 performs a decrementing operation on the count value C1 captured at time t5 (refer to the count value C4), and the complementary pulse width counter 28 is in the state of performing a decrementing operation on the count value C2 captured at the time t5 (refer to count value C5).

When fiber time elapses and the time t6 is reached, because the flag FN is output from the flag generator 22, the pulse width memory 24 captures the count value C1 of the period measurement counter 23. At the time at which time t6 is passed, the count value C5 of the complementary pulse width counter 28 becomes "0", and the counting end pulse signal E2 is output to the RS flip-flop circuit 29 from the complementary pulse width counter 28. By doing this, the Q output of the RS flip-flop circuit 29 changes to "0" and the complementary signal K3 falls.

When the time passes t6 and reaches time t7, the flag FP is output from the flag generator 22 and the flag FA1 falls. The complementary period counter 25 captures the count value C1 of the period measurement counter 23 at the time that the flag FA1 falls (the value "14" in the example shown in FIG. 4), and starts decrementing the captured value in synchronization with the reference clock CLK (refer to the count value C3 in FIG. 4). At this point, the value captured by the complementary period counter 25 is a value that indicates the length of one period of the synchronous detection signal K2.

At the time t6, the count value C4 of the complementary period counter 26 becomes "0" and a counting end pulse signal is output from the complementary period counter 26. The count pulse signal is logically summed by the OR circuit 27 with the counting end signal output from the complementary period counter 25 and outputs as a complementary period end signal E1 to the complementary pulse width counter 28 and the RS flip-flop circuit 29. When the complementary period end signal E1 is input to the RS flip-flop circuit 29 (more precisely, at the falling edge of the complementary period end signal E1), the Q output of the RS flip-flop circuit 29 changes to the value "1" and the complementary signal K3 rises. The complementary pulse width counter 28 captures the count value C2 stored in the pulse width memory 24 (the value "7" in the example shown in FIG. 4), and starts decrementing in synchronization with the reference clock CLK (refer to the count value C5 in FIG. 4).

If we take notice of the period between time t5 and time t7, the period of time from the rising edge to the filling edge of the complementary signal K3 is established by the count value C2 that is captured from the pulse width memory 24 by the complementary pulse width counter 28 at the time t5 (the value "7" in the example shown in FIG. 4). This count value C2 is a value obtained by measuring the pulse width of the synchronous detection signal K2 during the time t3 to t4. The time from the rising edge of the complementary signal Complementary signal 13, followed by filling edge and then up until the next rising edge is established by the count value C1 captured from the period measurement counter 23 by the complimentary period counter 26 at the time t5 (the value "14" in the example shown in FIG. 4). This count value C1 is a value obtained by measuring the length of one period of the synchronous detection signal K2 during the time t3 to t5.

In this manner, the signal processing apparatus 20 of this embodiment measures each period length and pulse width of the synchronous detection signal K2 and from these measurement results generates the complementary signal K3, which is delayed by one period with respect to the synchronous detection signal K2. This processing corresponds to the processing of the sixth step in the present invention. The generated complementary signal K3 is output to the OR circuit 30, at which it is logically summed with the synchronous detection signal K2 that is output from the synchronization section 21, so as to generate the complementary detection signal K4. This complementary detection signal K4 is output as the detection signal S2 from the output terminal T2 (refer to FIG. 1). Thereafter, the above-described operations are performed in the same manner to generate the complementary signal K3, which is delayed by one period with respect to the synchronous detection signal K2, the logical sum of the synchronous detection signal K2 and complementary signal K3 is taken to generate the complementary detection signal K4, with these operations being repeated.

The above is a detailed description of the signal processing method according to the first embodiment of the present invention, which was for the case in which a detection signal K1 having a missing pulse is input to the signal processing apparatus 20.

Figure 5:
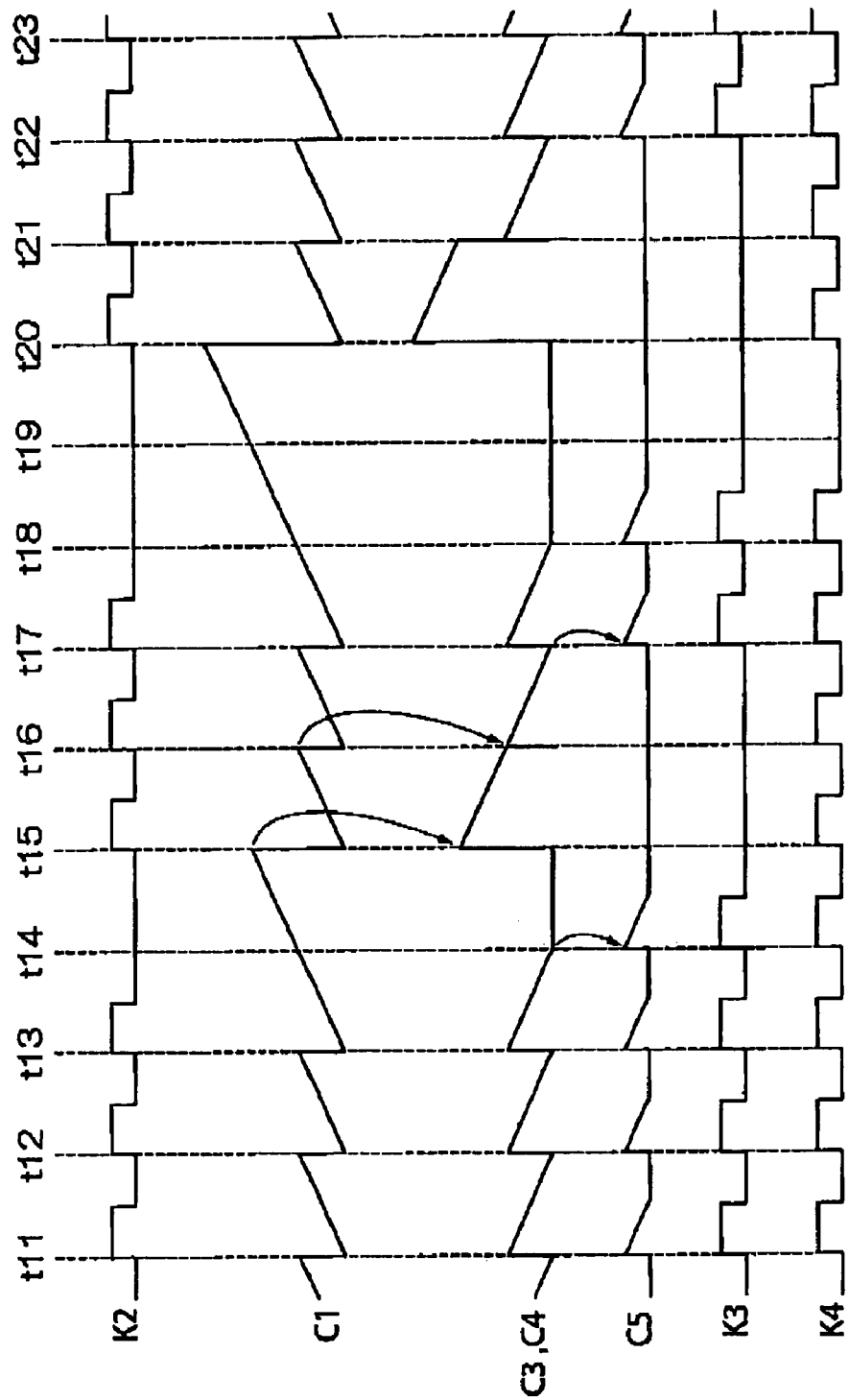
FIG. 5 is a timing diagram showing the operation when a detection signal exhibiting a missing pulse is input to a signal processor.

FIG. 5 is a timing diagram showing the operation when the detection signal K1 having a missing pulse is input to the signal processing apparatus 20. In FIG. 5, for the purpose of simplification, the count value C1 of the period measurement counter 23, the count values C3 and C4 of the complementary period counters 25 and 26 and the count value C5 of the complementary pulse width counter 28 are shown as triangular waves. In these, a rise towards the right indicates an incremented count value, and a fall towards the right indicates a decremented count value.

In the example shown in FIG. 5, the synchronous detection signal K2 that is obtained by synchronization of detection signal K1 has a missing pulse for just one period from the time t14 to the time t15, and has missing pulses for two periods from the time t18 to the time t20. With respect to this type of synchronous detection signal K2, up until the time t13, where there is no missing pulse, the period measurement counter 23 repeats the operations of resetting the count value C1 for each period of the synchronous detection signal K2 and incrementing the count value C1 in synchronization with the reference clock CLK.

For each period of the synchronous detection signal K2, the complementary period counters 25 and 26 alternately perform the operations of capturing the count value C1 measured at the previous period by the period measurement counter 23, and decrementing the captured count value C1 in synchronization with the reference clock CLK (refer to count values C3 and C4 in FIG. 5). Additionally, each time the count values C3 and C4 of the complementary period counters 25 and 26 change to "0", the count value C2 (count value indicating the length of the period of the synchronous detection signal K2 one period before) stored in the pulse width memory 24 is captured and decrementing is repeated (refer to count value C5 in FIG. 5). By doing this, the complementary signal K3 is generated for each period of the synchronous detection signal K2.

When the time t13 elapses, because the synchronous detection signal K2 falls one time between time t13 and time t14, the count value C1 of the period measurement counter 23 at that time is stored by the pulse width memory 24. However, because a missing pulse occurs between time t14 and time t15, even when the time t14 is reached, the count value C1 of the period measurement counter 23 is not reset, and counting is continued until the rise of the synchronous detection signal K2 (until the time t15).

At time t14, because the synchronous detection signal K2 rises, the count value C1 of the period measurement counter 23 is not captured into the complementary period counters 25 and 26. At time t14, however, because the count values of the complementary period counters 25 and 26 are "0", the complementary period end signal E1 is output from the OR circuit 27. By doing this, at the point at which the synchronous detection signal K2 falls one time between time t14 and time t15, the complementary signal K3 is generated in the time between time t14 and time t15, this continuing with a pulse width that is the count value C2 captured in the pulse width memory pulse width memory 24.

When the time t15 is reached, because the synchronous detection signal K2 rises, the complementary period counters 25 and 26 capture the count value C1 of the period measurement counter 23 (indicating the length of two periods of the synchronous detection signal K2), and start the operation of decrementing the captured count value C1 in synchronization with the reference clock CLK (refer to count values C3 and C4 in FIG. 5). When the synchronous detection signal K2 rises, the period measurement counter 23 resets the count value C1 and starts counting in synchronization with the reference clock CLK. However, during the period from time t14 to time t15, because the complementary period counters 25 and 26 are not decrementing, and the count values remains as "0", even when time t15 is reached the complimentary period end signal E1 is not output from the OR circuit 27. For this reason, the complementary signal K3 is not generated between time t15 and time t16.

Because the synchronous detection signal K2 falls one time during the time period from time t15 to time t16, the count value C1 of the period measurement counter 23 at that time is stored by the pulse width memory 24. After that, the operation of decrementing the count value captured by the complementary period counters 25 and 26 is started. The period measurement counter 23 resets the count value Count value C1 and repeats costing in synchronization with the reference clock CLK.

In the period between time t15 and t16, the complementary period counters 25 and 26 are decrementing, and the initial values are the count value C1 indicating the length of two periods of synchronous detection signal K2, which is captured at time t15. For this reason, even when time t16 is reached, the count values of the complementary period counters 25 and 26 do not change to "0", and the complementary period end signal E1 is not output. For this reason, the complementary signal K3 is not generated in the time period from time t16 to time t17 as well.

When time t17 is reached, because the count value of the complementary period counter 26 changes to "0", the complementary period end signal E1 is output from the OR circuit 27. By doing this) the complementary signal K3 is generated during the time from time t17 to time t18, with a pulse width having a duration that is the count value C2 captured at the time the synchronous detection signal K2 fell during the period from t16 to t17.

In the time period from time t11 to t18, the synchronous detection signal K2 has a missing pulse for one period in the time period from time t14 to time t15, and the generated complementary signal K3 has a missing pulse occurring for two periods from time t15 to time t17. Therefore, if the logical sum is taken, the complementary detection signal K4 is generated in which the missing pulses are completed complemented as shown in FIG. 5.

As described above, in the signal processing apparatus 20 shown in FIG. 2, a complementary signal K3 is not generated starting from the period fiat the count value C1 of the period measurement counter 23 exceeds the count value for one period of the synchronous detection signal K2 until the count values C3 and C4 of the complementary period counters 25 and 26 are "0" (until time t17). For this reason, as shown in FIG. 5, when a missing pulse for two periods occurs during the time period from t18 to t20, periods after the period when the count value C1 of the period time measurement counter 23 exceeds the count value for one period of the synchronous detection signal K2, that is, until the count values C3 and C4 of the complementary period counters 25 and 26 change to "0", this being until the time t22, the complementary signal K3 is not generated.

Therefore, during the time from time t17 to time t23, the synchronous detection signal K2 experiences a missing pulse for two periods, from time t18 to time t20, and the generated complementary signal K3 experiences a missing pulse for three periods, from time t19 to dime t22. If the logical K3 is taken of these, as shown in FIG. 5, a missing pulse for one period that is not complemented occurs from time t19 to time t20. In this manner, in this embodiment the is complementing of missing pulses over one period and the first missing pulse of a series of continuous missing pulses over a plurality of periods, and in the case in which a plurality of continuously missing pulses occurs, because there is basically a possibility that an abnormality has occurred in either the laser light source 11 or the interferometer system 10, the second and subsequent missing pulses or abnormalities are not complemented, but rater detected as errors. Furthermore, not only the first pulse of a series of continuous periods, in the case of performing complementing processing, a plurality of signal processing systems shown in FIG. 2 can be provided to perform complementing processing.

Figure 6:
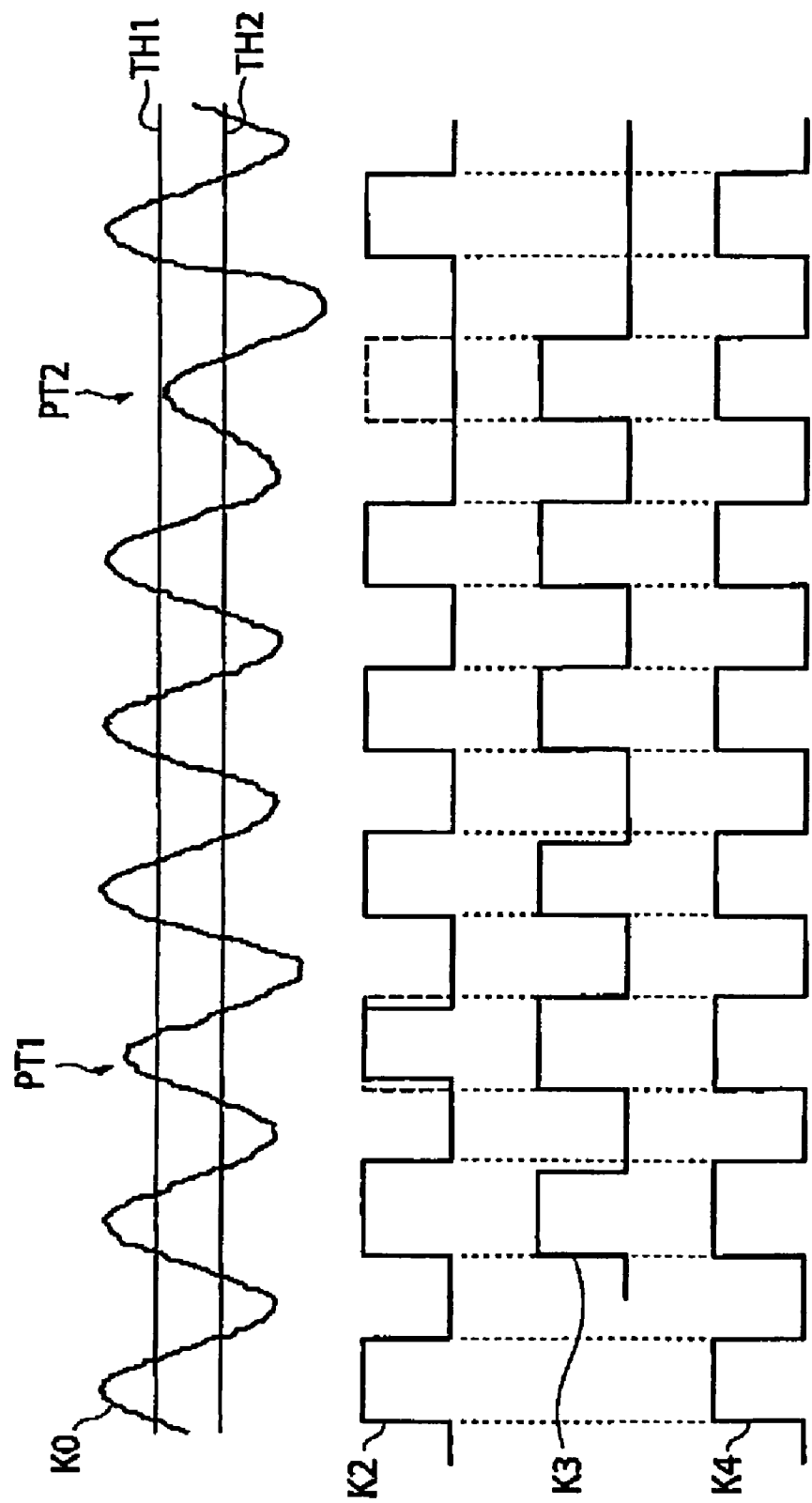
FIG. 6 is a drawing showing in general the processing in the signal processing method according to an embodiment of the present invention.

FIG. 6 is a drawing showing a summary of the processing in the signal processing method of this embodiment of the present invention.

In FIG. 6 the detection signal K0 is the same as shown in FIG. 3, and the synchronous detection signal K2 is shown in place of the detection signal K1. This detection signal K1 experiences a sudden change in pulse width at the time position shown as PT1, and a missing pulse at the time position shown as PT2. For a synchronous detection signal K2 exhibiting such changes, in this embodiment the complementary signal K3 is generated by delaying by one period with respect to the synchronous detection signal K2 (the second, delaying, step), and the logical sum of the synchronous detection signal K2 and the complementary signal P3 is taken to generate the complementary detection signal K4 (the second, synthesizing, step).

As shown in FIG. 6, the complementary signal K3 is generated by delaying the original synchronous detection signal K2 by one period, and is at the same time position as a pulse which does not exhibit a sudden change in pulse width, and if the logical sum of these are taken, the complementary detection signal K4, which is completely complemented for the sudden change in pulse width, is obtained. If the location of the synchronous detection signal K2 at which the missing pulse occurs and location of the complementary signal K3 at which the missing pulse occurs are disposed at the same time location and the logical sum of these taken, a complementary detection signal K4 is obtained which is completely complemented for the missing pulse. In this manner, according to this embodiment, because it is possible to obtain a complementary detection signal K4 that is completely complemented for the sudden change in pulse width and missing pulse in the detection signal K1, it is possible to measure the position information of the object under measurement OB with high accuracy.

Second Embodiment

Figure 7:
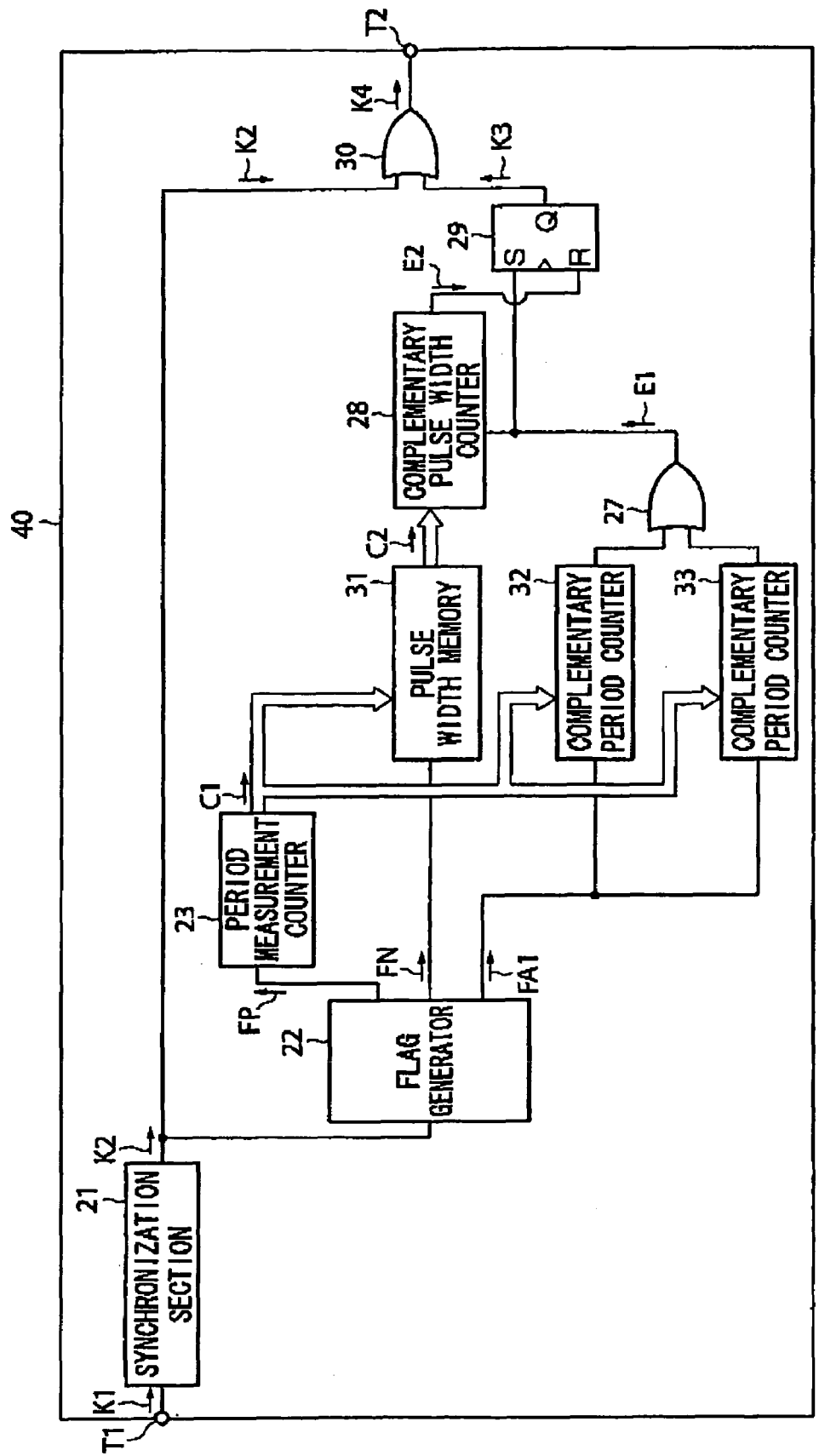
FIG. 7 is a block diagram showing the configuration of a signal processor in which a signal processing method according to a second embodiment of the present invention is used.

FIG. 7 is a block a diagram showing the configuration of an interferometer system in which a signal processing method according to the second embodiment of the present invention is used.

The difference in the signal processing apparatus 40 using ten signal processing method according to the second embodiment of the present invention from the signal processing apparatus signal processing apparatus 20 using the signal processing method according to the first embodiment of the present invention is that, in place of the pulse width memory 24, the complementary period counter 25, and the complementary period counter 26 of FIG. 2, the pulse width memory 31, the complementary period counter 32, and the complementary period counter 33 are provided.

The pulse width memory 31, the complementary period counter 32, and the complementary period counter 33 shown in FIG. 7 basically perform operations similar to the pulse width memory 24, the complementary period counter 25, and the complementary period counter 26 of FIG. 2, but there is a difference in that the count value C1 captured from the period measurement counter 23 is varied several periods of the reference clock CLK. This processing is done for the following reason. Specifically, the detection signal K1 input from the input terminal T1 and the reference clock CLK used within be signal processing apparatus 20, and the period and pulse width of the detection signal K1 are measured with the reference clock CLK, which is asynchronous with the detection signal K1. For this reason, the period and pulse width of the generated complementary signal K3 and period and pulse width of the detection signal K1 each have an error of several reference clocks CLK, and this error brings with it the risk of object under measurement OB measurement error.

Figure 8:
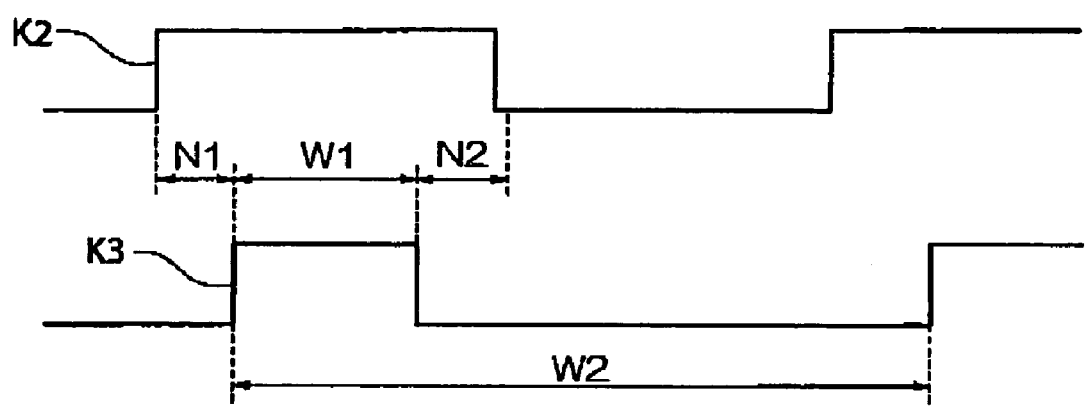
FIG. 8 is a drawing showing an example of the time position relationship between a synchronization detection signal and an interpolation detection signal.

FIG. 8 is a drawing showing an example of the positional relationship between the synchronous detection K2 and the complementary signal K3. In this embodiment, by making the count values of the pulse width memory 31, the complementary period counter 32, and the complementary period counter 33 variable, the period W2 of the complementary signal K3, the starting delay amount N1 of the complementary signal K3, and the pulse width W1 of the complementary signal K3 are adjusted. Also, by adjusting the starting delay amount N1 or pulse width of the complementary signal K3, the time N2 from the fang edge of the complementary signal K3 to the filling edge of the synchronous detection signal K2 is also varied.

Specifically, the count values of the complementary period counters 32 and 33 are adjusted so that the period W2 of the complementary signal K3 is made longer or shorter, relative to the synchronous detection signal 12, by one period of the reference clock CLK. The count values of the complementary period counters 32 and 33 are adjusted so that the starting delay amount N1 of the complementary signal K3 is made a delay of from 1 to 4 periods of the reference clock CLK. Additionally, the count value C2 stored in the pulse width memory 31 is adjusted so that the pulse width W1 of the complementary signal K3 is made from 2 to 3 periods of the reference clock CLK shorter, relative to the pulse width of the synchronous detection signal K2. The setting of the amount of adjustment of the pulse width memory 31, the complementary period counter 32, and the complementary period counter 33 is established beforehand by experiment.

Because the basic operation of the signal processing apparatus 20 shown in FIG. 8 is the similar to the operation described making reference to FIG. 4 and FIG. 5, a detailed description will be omitted herein.

Figure 9:
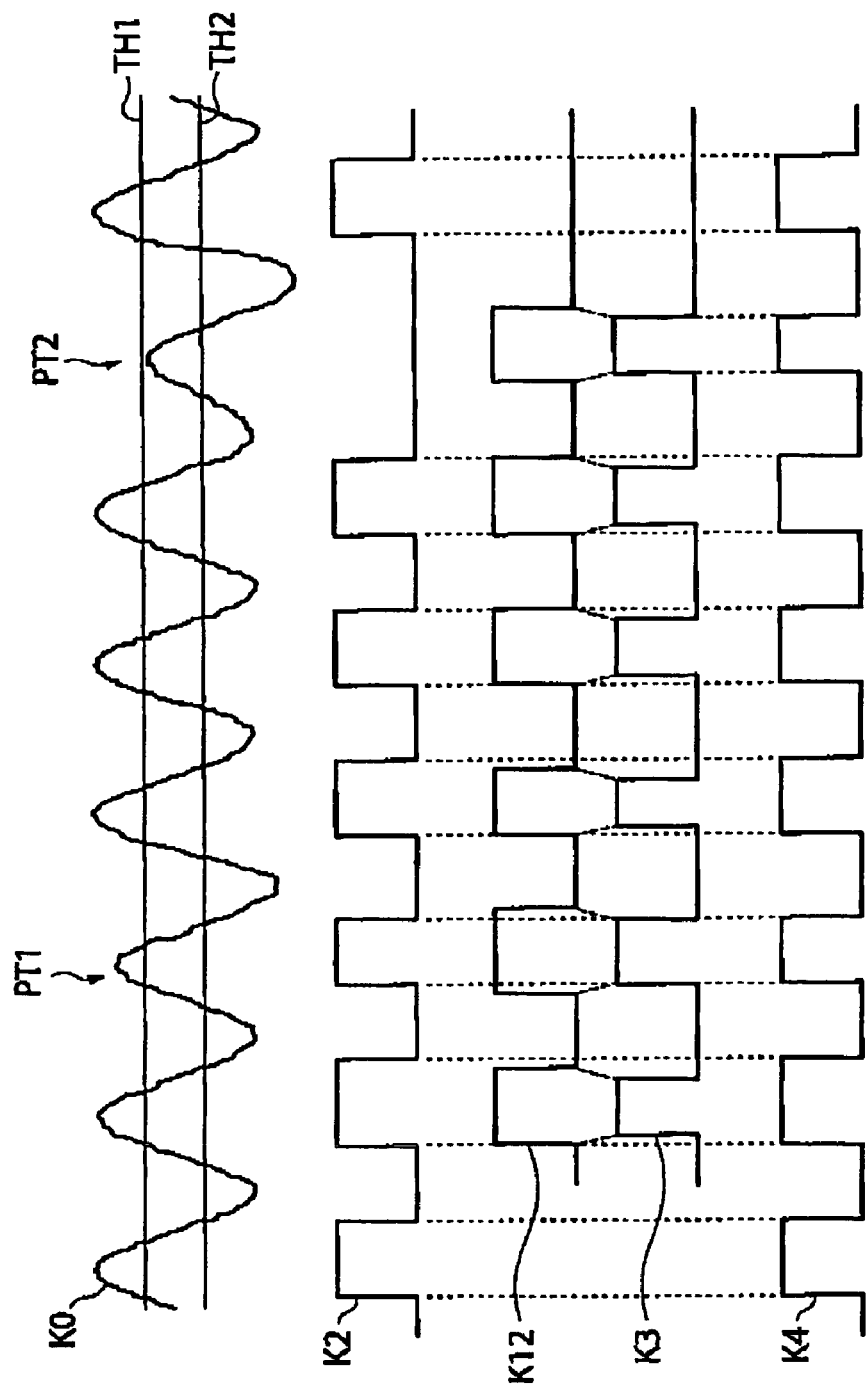
FIG. 9 is a drawing showing an example of the time position relationship between interpolation detection signals generated by the signal processing method according to the second embodiment of the present invention and an interpolation detection signal.

FIG. 9 is a drawing showing an example of the time positional relationship between the complementary signal K3, the complementary detection signal K4 and the synchronous detection signal K2 that are generated in the signal processing method according to the second embodiment of the present invention.

In FIG. 9, similar to FIG. 6, the detection signal K0 and synchronous detection signal K2 are shown. The synchronous detection signal K2 exhibits a sudden pulse with change at a location marked PT1 and a missing pulse at the location marked PT2.

For a synchronous detection signal K2 exhibiting such changes, in this embodiment as well, similar to the first embodiment, the complementary signal K3 is generated by delaying by 1 period with respect to the synchronous detection signal K2 (the second, delaying, step). Also, for the purpose of comparison, the complementary signal generated in the signal processing method of the first embodiment is shown as K12.

The complimentary signal 3 generated in this embodiment, because of the adjustment of the count values of the pulse width memory 31, the complementary period counter 32, and the complementary period counter 33 shown in FIG. 7, has a pulse width that is reduced, relative to the complementary signal K12 (the seventh, processing, step). The pulses at each period of the complimentary signal K3 have rising edges that are delayed relative to the rising edges of each period in the synchronous detection signal K2, and have falling edges that are delayed relative to the filling edges of each period in the synchronous detection signal K2.

Thus, if the logical sum is taken of the complementary signal K3 generated by the signal processing method of this embodiment and the synchronous detection signal 12, in order to generate the complementary detection signal K4 (the fourth, complementing, step), a complementary detection signal K4 is generated in which the pulse width in many periods of the synchronous detection signal K2 is reflected. In this manner, in this embodiment by performing complimenting giving prior to the original synchronous detection signal K2, it is possible to minimize the error of the compensated pulse width. Also, as shown in FIG. 9, in this embodiment as well theme is a missing pulse of 1 period of the synchronous detection signal K2. Thus, according to this embodiment, the ability to perform complementing of a sudden change in pulse width or missing pulse in the synchronous detection signal K2 with a minimum error, is of great advantage in measuring the position information of the object under measurement with high accuracy.

Third Embodiment

Figure 10:
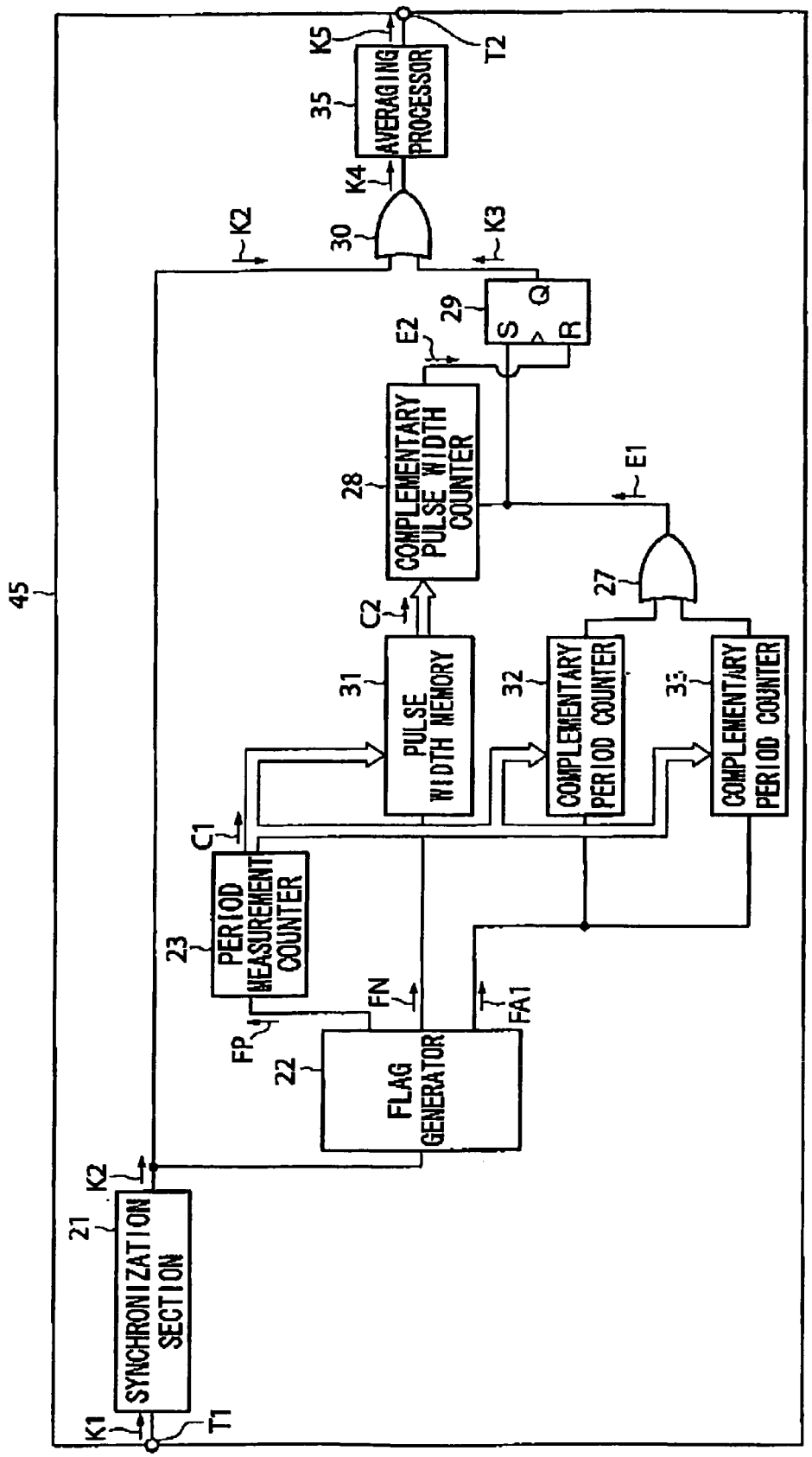
FIG. 10 is a block diagram showing the configuration of a signal processor in which a signal processing method according to a third embodiment of the present invention is used.

FIG. 10 is a block diagram of the configuration of a signal processing apparatus in which a signal processing method according to the third embodiment of the present invention is used.

The signal processing apparatus 45 in which the signal processing method of the third embodiment of the present invention is used differs from the signal processing apparatus 40 in which the signal processing method of the second embodiment of the present invention is used in that an averaging processor 35 is provided between the OR circuit 30 and the input terminal T2.

The avenging processor 35 is configuration, for example, so as to include a PLL (phase-locked loop) circuit and is for the purpose of averaging the pulse width (dime width) of the complementary detection signal K4.

As is well known, a PLL circuit includes an error detector, a VCO (voltage-controlled oscillator), a loop filter, and a frequency divider which form a feedback system, wherein feedback control is performed of the VCO within the loop to cause it to oscillate so that the phase error between an externally input signal and the output of the VCO within the loop is constant.

Similar to the first embodiment and second embodiment, this embodiment basically also uses the period and pulse width of the synchronous detection signal K2 to generate a complementary signal K3 by making a delay of 1 period relative to the synchronous detection signal K2 (second, delaying, step), and calculating the logical sum of this complementary signal K3 and the synchronous detection signal K2 to generate the complementary detection signal K4 (third, synthesizing, step).

However, this complementary detection signal K4 includes detection signal K1 sampling error (measurement error in measuring the period and pulse width of the detection signal K1 with a reference clock CLK that is asynchronous with respect to the detection signal K1), and detection signal K1 jitter. For this reason, in this embodiment the averaging processor 35 uses a PLL circuit to average the pulse width of the complementary detection signal K4 and generate the averaged complementary detection signal K5, thereby removing the pulse width error on the complementary detection signal K4 (averaging step).

Figure 11:
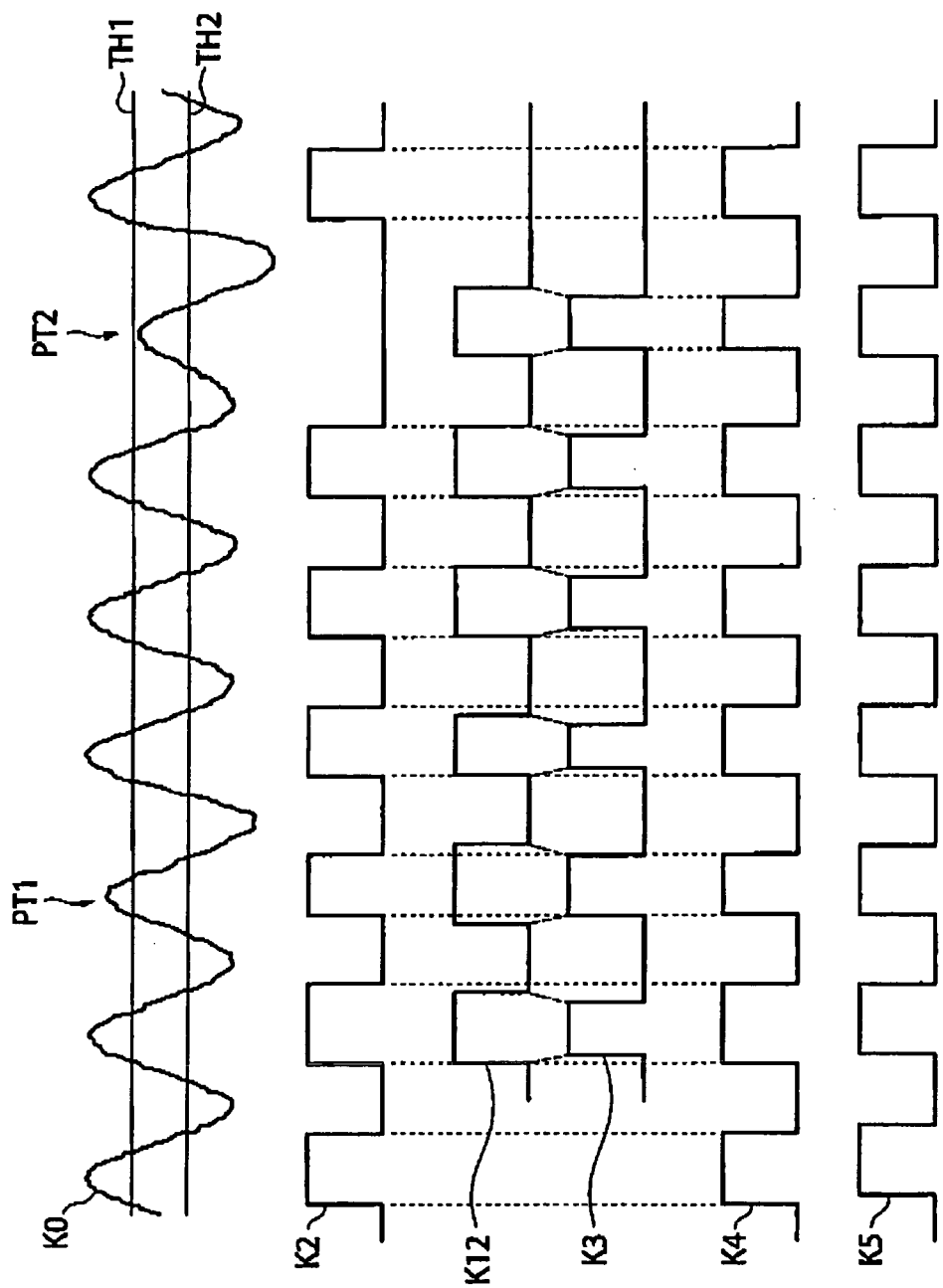
FIG. 11 is a drawing showing an example of the time position relationships between an interpolation signal and an interpolation detection signal generated by the signal processing method according to the third embodiment of the present invention and an input detection signal.

FIG. 11 is a drawing showing the time positional relationship between complementary signal K3 and complementary detection signal K4 generated in the signal processing method according to the third embodiment, and the input detection signal K1. In FIG. 11, similar to FIG. 9, a complement signal K30 generated by the signal processing method of the first embodiment and the complementary signal K3 and complementary detection signal K4 generated using the signal processing method of the second embodiment are also shown.

In FIG. 11, similar to FIG. 9, the synchronous detection signal K2 and the complementary signal K12 generated in the first embodiment are shown. The synchronous detection signal K2 exhibits a sudden change in pulse width at a location marked PT1, and a missing pulse at a location marked PT2. With respect to the synchronous detection signal K2 shown in FIG. 11, one and the same complementary signal K3 and complementary detection signal K4 as generated in the second embodiment are generated. When the complementary detection signal K4 is input to the averaging processor 35, the complementary signal Averaged complementary detection signal K5 is generated.

If we take note of the generated complementary detection signal K4, it can be seen that, compared with other locations, to pulse width at the locations PT1 and PT2 is narrower. In comparison, the complementary signal generated by the averaging processor 35 has an averaged pulse with at each period, and there is almost no variation in the pulse width. In this manner, in this embodiment, a complementary signal Averaged complementary detection signal K5 is obtained in which the pulse width variations are averaged and if this complementary detection signal K5 is used, it is possible to measure the position information of the object under measurement with further improved accuracy.

In the description above, although the example was of a configuration in which the signal processing apparatus 40 in which the signal processing method of the second embodiment is used has an averaging processor 35 provided between the or and the input terminal T2, it is also possible to achieve the same effect by providing the averaging processor 35 between the OR circuit 30 and the output terminal 12 of the signal processing apparatus 20 in which the signal processing method of the first embodiment is used.

Although in the fit to third embodiments the synchronous detection signal K2 was generated from an asynchronous detection signal K1 via a synchronization section 21, with input being made to one input terminal of the OR circuit 30 as a synchronous circuit, it is also possible to provide the synchronization section 21 immediately before the flag generator 22, and input the asynchronous detection signal K1 as is to the OR circuit 30. In this case, the OR circuit 30 becomes an asynchronous circuit, and the complementary detection signal K4 output from the OR circuit 30 is also an asynchronous signal. Whether a synchronous detection signal K1 is to be input to the OR circuit (asynchronous circuit) 30 as is or input to the OR circuit (synchronous cut) 30 after generating the synchronous detection signal K2 can be determined by consider the signal quality of the signal input to the input terminal T1 and the delay period and the like of the complementary signal.

Fourth Embodiment

In the above-described bat through third embodiments, the descriptions were of a signal processing method that complements for a missing pulse in the synchronous detection signal K2, that is, the condition in which the state does not change within 1 period, the value remaining "0". However, in contrast to the above-noted missing pulse, there is also a pulse in which the state within 1 period does not change, but the value remains as "1".

Figure 12A:
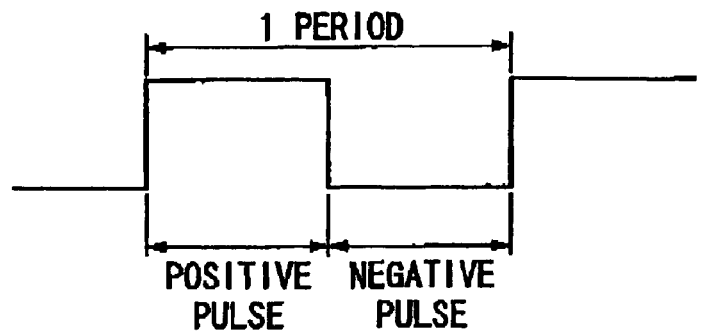
FIGS. 12A, 12B and 12C are drawings illustrating the types of missing pulse conditions.
Figure 12B:
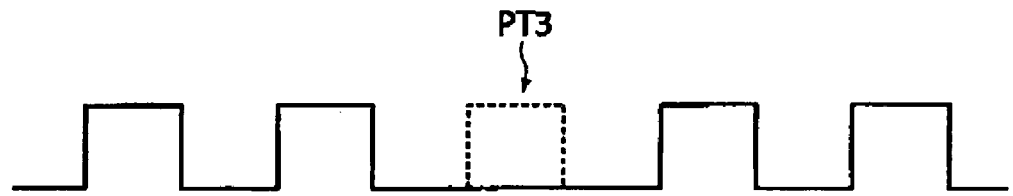
Figure 12C:
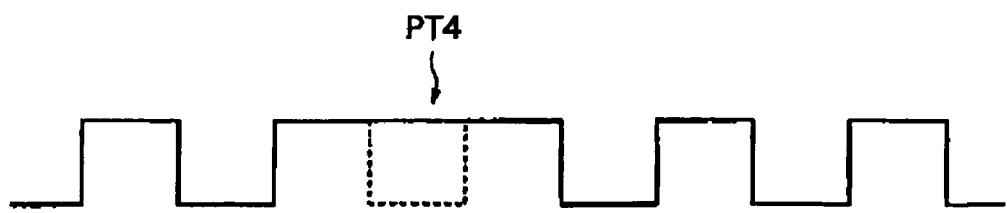

FIG. 12A to FIG. 12C are drawings illustrating types of missing pulses. As shown in FIG. 12A, within 1 period of the synchronous detection signal Synchronous detection signal K2, the time from the rising edge to the falling edge is defined as a positive pulse, and the time from the falling edge to the rising edge of the synchronous detection signal K2 is defined as a negative pulse.

The missing pulses describe in the first to the third embodiments, as shown at FIG. 12B as PT3, a missing positive pulse in which the state within 1 period does not change, but remains as the value of "0", and in contrast the missing pulse shown as PT4 in FIG. 12C is a missing negative pulse, in which the state does not change within 1 period, but remains as the value of "1". In the signal processing methods in the above-described first to third embodiments, a missing positive pulse is complemented, but it is not possible to complement a missing negative pulse. In the signal processing method of this embodiment, it is possible to complement both missing positive pulses and missing negative pulses.

Figure 13:
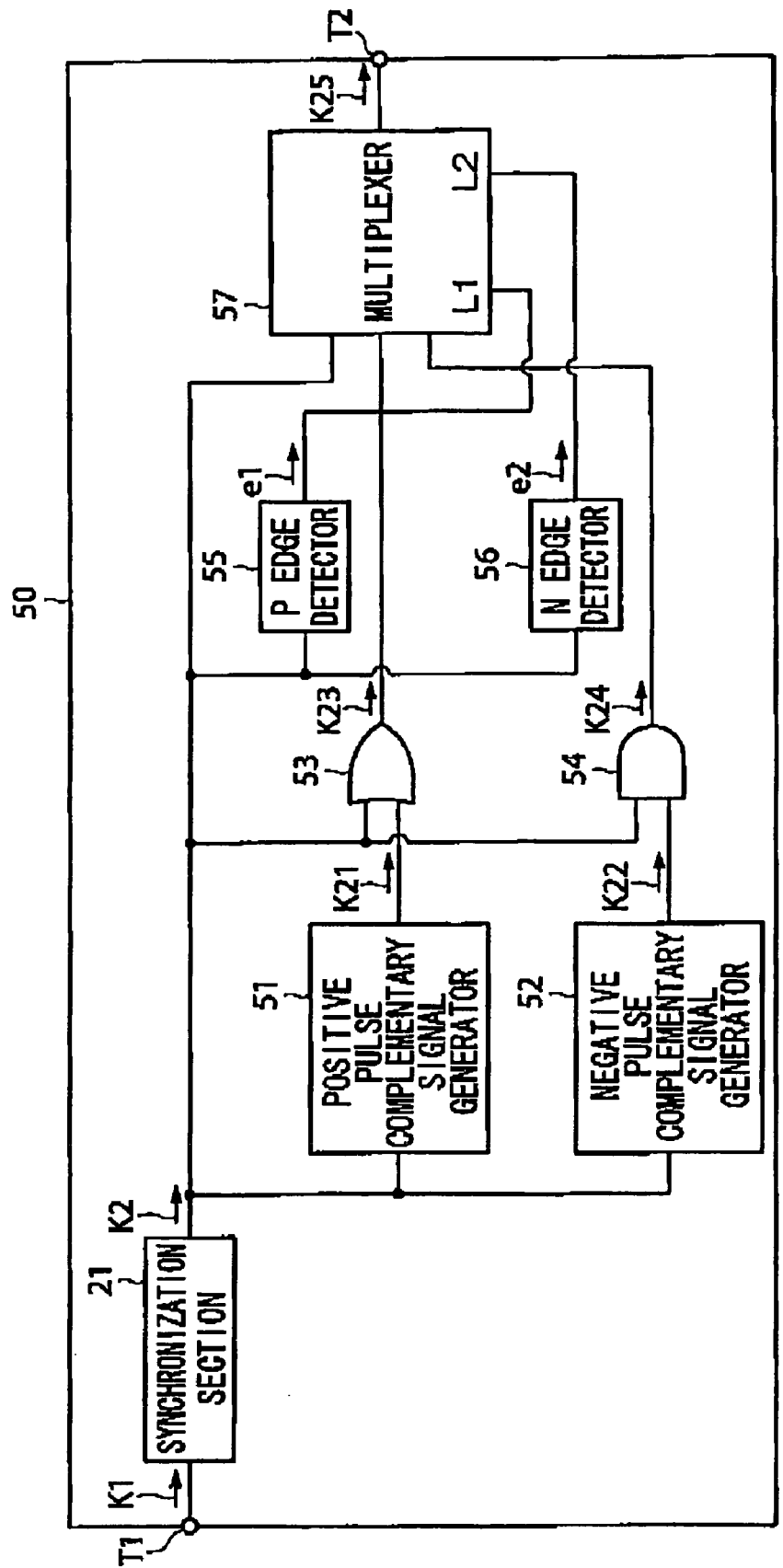
FIG. 13 is a block diagram showing the configuration of a signal processor in which a signal processing method according to a fourth embodiment of the present invention is used.

FIG. 13 is a block diagram showing the configuration of a signal processing apparatus in which the signal processing method according to the fourth embodiment is used.

As shown in FIG. 13, the signal processing apparatus 50 in which the signal processing method of this embodiment is used is configured so as to include a synchronization section 21, a positive pulse complementary signal generator 51, a negative pulse complementary signal generator 52, an OR circuit 53, a logical product calculating circuit 54 thereinafter referred to as an AND circuit), a P edge detector 55, an N edge detector 56, and a multiplexer 57. In this embodiment as well, each block within the signal processing apparatus 50 is supplied with a reference clock CLK (not illustrated in FIG. 13) having a frequency of approximately 200 MHz and other clocks are synchronized to this clock.

The above-noted synchronization section 21 is similar to the synchronization section 21 described regarding the first to third embodiments, and generates the synchronous detection signal synchronous detection signal K2 by synchronizing the signal K1 input via the input terminal T1 to the reference clock CLK. The positive pulse complementary signal generator 51 is configured to include the flag generator 22 to the RS flip-flop circuit 29 provided in the signal processing apparatus signal processing apparatus 20 in which the signal sing method of the first embodiment is used (refer to FIG. 2), the configuration is one in which the pulse width memory 31 and complementary period counters 32 and 33 are provided in place of the pulse width memory 24 and complementary period counters 25 and 26 included therein (refer to FIG. 7), and which generates the above-described complementary signal K3 and similar complementary signal K21 (first delayed signal). The complementary signal 21 is mainly for complementing positive pulses.

The negative pulse complementary signal generator 52 is configured almost the same as the positive pulse complementary signal generator 51, and mainly generates the complementary signal K22 (second delayed signal) that complements missing negative pulses. The positive pulse complementary signal generator 51 and the negative pulse complementary signal generator 52 are configured so as to include the flag generator 22 to the RS flip-flop circuit 29 shown in FIG. 2, and the differences in the configurations thereof are described below.

The period measurement counter 23 of the positive pulse complementary signal generator 51 has input to it the flag FP that is output from the flag generator 22, and the flag FN is input to the pulse width memory 24. In contrast to this, the period measurement counter 23 of the negative pulse complementary signal generator 52 has input to it the flag FN that is output from the flag generator 22, the flag FP is input to the pulse width memory 24, which is the reverse of the positive pulse complementary signal generator 51.

The complementary period counters 25 and 26 of the positive pulse complementary signal generator 51 have input to them the flag-FA1, which changes in value each time the flag FP is output, whereas the complementary period counters 25 and 26 of the negative pulse complimentary signal generator 52 have input to them the flag FA2 (refer to FIG. 15), which changes in value each time the flag FN is output (the value alternates between "1" and "0").

As described with reference to FIG. 4, the positive pulse complementary signal generator 51 measures the length of each period (length from the rising edge to the falling edge of the synchronous detection signal K2) and these width (length of the time within 1 period during which the value is "0"), based on the rising edge of the synchronous detection signal K2, and generates the synchronous detection signal K2. In contrast to this, the negative pulse complementary signal generator 52 measures the length of each period (length from the failing edge to the rising edge of the synchronous detection signal K2) and the pulse width ((length of the fine within 1 period during which the value is "0"), based on the falling edge of the synchronous detection signal K2 and generates the complementary signal K22.

The OR circuit 53 takes the logical product of the complementary signal K21 output from the positive pulse complementary signal generator 51 and the synchronous detection signal K2 output from the synchronization section 21 and generates the complementary signal K23. The AND circuit 54 takes the logical sum of the complementary signal K22 output from the negative pulse complementary signal generator 52 and the synchronous detection signal K2 output from the synchronization section 21 and generates the complementary signal K24. These complementary signals K23 and K24 are output to the multiplexer 57.

The P edge detector 55 detects the presence or absence of a rising edge on the synchronous detection signal K2, and outputs a detection error signal e1 when a rising edge of the synchronous detection signal K2 is not detected in a pre-established edge detection region. The N edge detector 56 detects the presence or absence of a falling edge on the synchronous detection signal K2, and outputs a detection error signal e2 when a falling edge of the synchronous detection signal K2 is not detected in a pre-established detection region.

Figure 14:
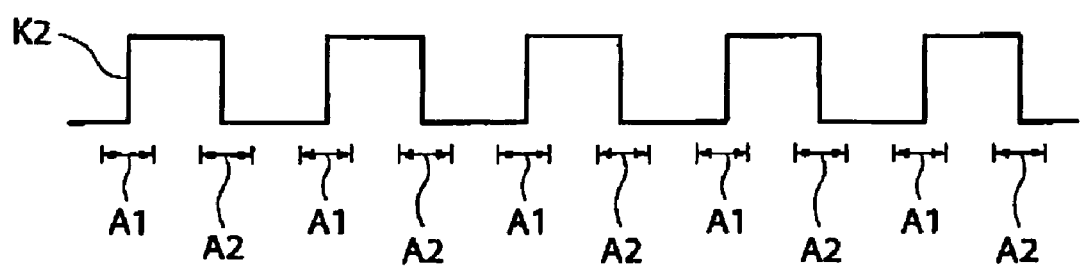
FIG. 14 is a drawing illustrating the edge detection region set by a P edge detection section and an N edge detection system.

FIG. 14 is a drawing describing the edge detection regions set in the P edge detector 55 and the N edge detector 56.

In FIG. 14, the region marked A1 is an edge detection region set in the P edge detector 55, and the region marked A2 is an edge detection region set in the N edge detector 56. As shown in the drawing, the edge detection regions A1 and A2 are set to have certain widths within which, without the influence of noise, the synchronous detection signal K2 is expected to rise or fall (for example a width of several clocks of the reference clock CLK for a prescribed time width).

The P edge detector 55 and the N edge detector 56 have a counter that is similar to the period measurement counter 23 shown in FIG. 2, and the detection region A1 and A2 widths are set based on the count value of this counter. To simplify the configuration of the P edge detector 55 and the N edge detector 56, it is possible to omit the counters provided therein, and to use the count values of the period measurement counter 23 provided in the positive pulse complementary signal generator 51 and the negative pulse complementary signal generator 52 to set the widths of the detection regions A1 and A2.

In this manner, the establishment of the edge detection regions and the detection of the rise and fall of the synchronous detection signal K2 not only enables detection even if because of, for example, sampling error, the time positions of the rising edge and the filling edge shift slightly, but also removes from the detection pulses having an extremely large degree of pulse width change. The detection error signal e1 from the P edge detector 55 is input to the error signal input terminal L1 of the multiplexer 57, and detection error signal e2 from the N edge detector 56 is input to the error signal input terminal L2 of the multiplexer 57.

The multiplexer 57, responsive to the detection error signals e1 and e2 input to the error signal input terminals L1 and L2, outputs either the complementary detection signal K23 or the complementary detection signal K24 as the complementary detection signal K25. Specifically if neither the detection error signal e1 nor the detection error signal detection error signal e2 is input to the error signal input terminals L1 or L2, the synchronous detection signal K2 is output as the complementary detection signal K25. If only the detection error signal e1 is input to the error signal input terminal L1, the complementary detection signal K23 is output as the complementary detection signal K25 from the point in time that the input occurs until a half-period of the synchronous detection signal K2 has elapsed. If only the detection error signal e2 is it to the error signal input terminal L1, the complementary detection signal K24 is output as the complementary detection signal K25 from the point in time that the input occurs until a half-period of the synchronous detection signal K2 has elapsed.

Next, the operation of the signal processing apparatus signal processing apparatus 50 having the above configuration, that is, the signal processing method of the fourth embodiment of the present invention, is described below.

Figure 15:
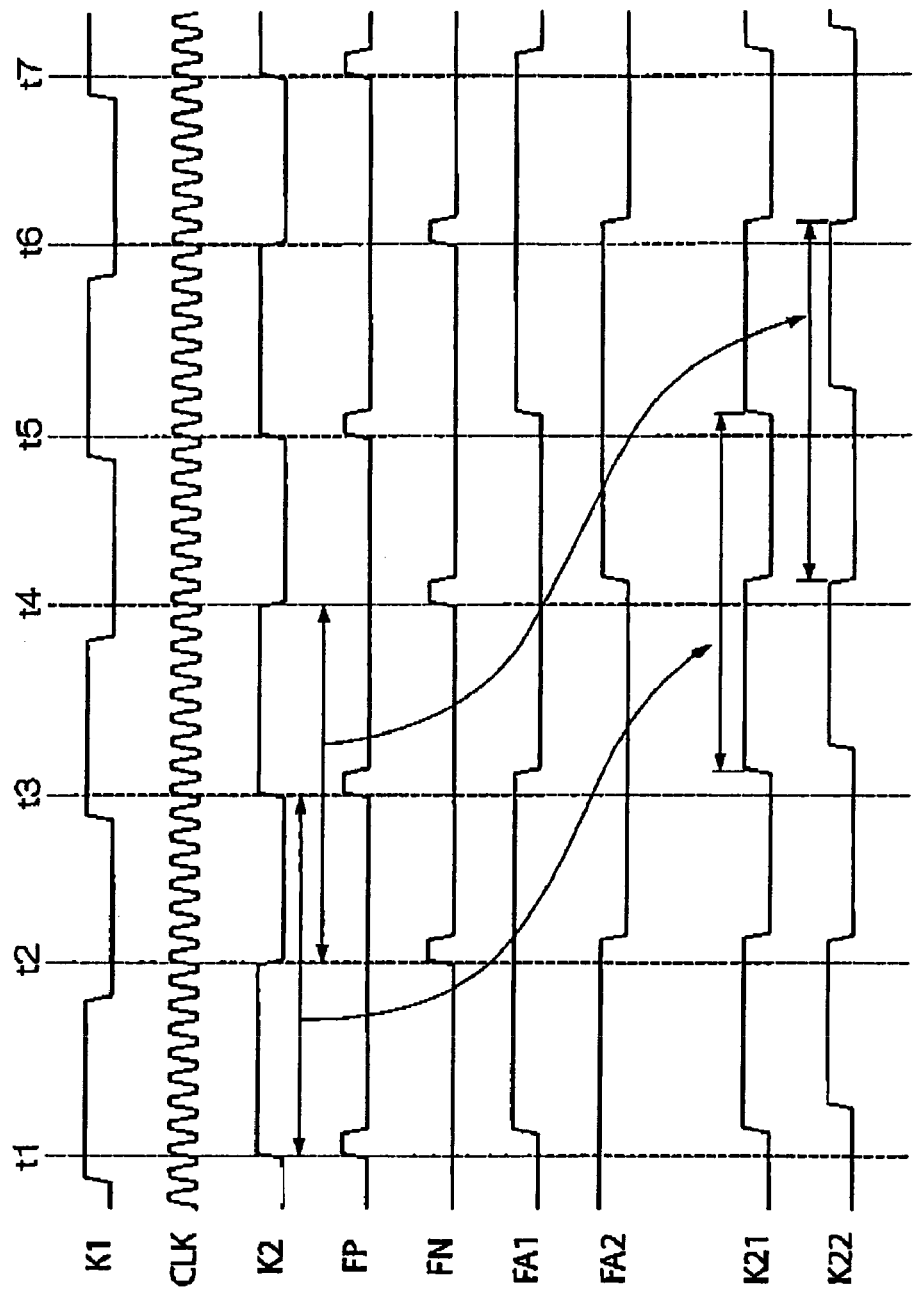
FIG. 15 is a timing diagram showing an example of interpolation signals that are generated in the signal method according to the fourth embodiment of the present invention.

FIG. 15 is a timing diagram showing an example of the complementary signals K21 and K22 that are generated in the signal processing method according to the fourth embodiment of the present invention.

The detection signal K1 shown in FIG. 15 is a detection signal that is input to the input terminal T1 of the signal processing apparatus 50 shown in FIG. 13, and the reference clock CLK is a reference clock input to the blocks within signal processing apparatus 50. In FIG. 15, similar to in FIG. 4, the times as which the state of the synchronous detection signal K2 changes are times t1 to t7.

When the detection signal K1 is input to the input terminal T1, the detection signal K1 is input to the synchronization section 21, at which it is synchronized to the reference clock CLK so as to generate the synchronous detection signal K2. The synchronous detection signal K7 is output to the positive pulse complementary signal generator 51, the negative pulse complementary signal generator 52, and the multiplexer 57. When the synchronous detection signal K2 is input to the positive pulse complementary signal generator 51, the flag generator 22 provided therein (refer to FIG. 2) generates the flags FP, FN, and FA1 shown in FIG. 15 and, based on these flags, processing is performed that is similar to the processing described using FIG. 4, so as to generate the complementary signal K21. When the synchronous detection signal K2 is input to negative pulse complementary signal generator 52, the flag generator 22 provided therein (refer to FIG. 2) generates the flags FP, FN, and FA2 shown in FIG. 15 and, based on these flags, processing is performed that is similar to the processing described using FIG. 4, so as to generate the complementary signal K22.

The generated complementary signals K21 and K22 are both delayed by 1 period with respect to the synchronous detection signal K2. For example, the complementary signal K21 generated in the time t3 to t5 (more precisely, at the first rising edge of the reference clock CLK after the elapse of these times) is generated based on the length of 1 period of the synchronous detection signal K2 from time t1 to time t3 and the width of the positive pulse from time t1 to time t2. Also, for example, the complementary signal K22 generated in the time t4 to t6 (more precisely, at the first rising edge of the reference clock CLK after the elapse of these times) is generated based on the length of 1 period of the synchronous detection signal K2 from time t2 to time t4 and the width of the positive pulse from time t2 to time t3.

The foregoing is a description of the complementary signals K21 and K22 in the signal processing method according to the fourth embodiment of the present invention, and the operation when a detection signal K1 having a missing positive pulse and a missing negative pulse is input to the signal processing apparatus 50 shown in FIG. 13 is described below.

Figure 16:
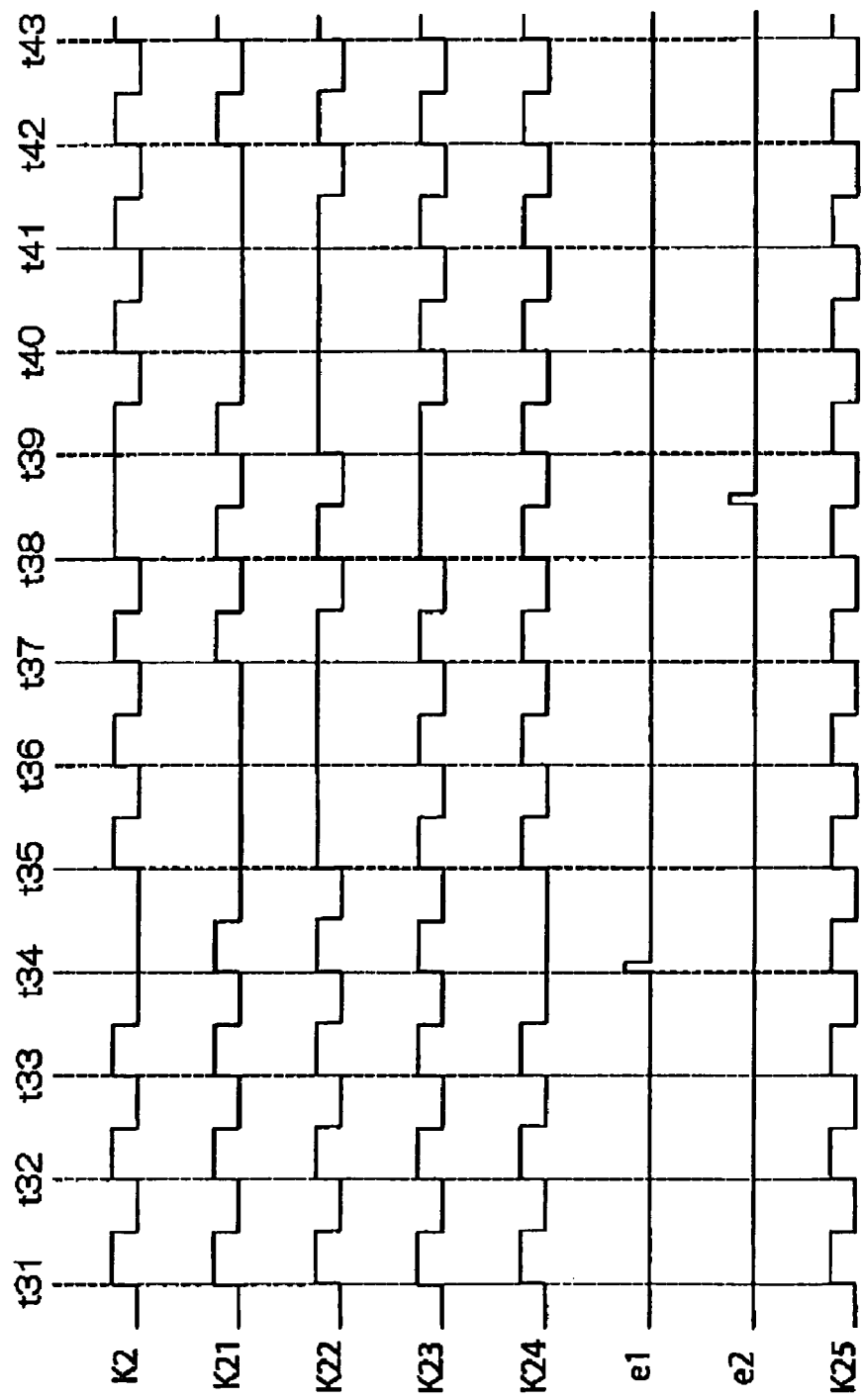
FIG. 16 is a timing diagram showing the operation when a detection signal exhibiting a missing positive pulse and a missing negative pulse is input to a signal processor.

FIG. 16 is a timing diagram showing the operation when a detection signal K1 having a positive pulse and a missing negative pulse is input to the signal processing apparatus 50.

In the example shown in FIG. 16, the synchronous detection signal K2 obtained by synchronizing the detection signal K1 has a missing positive pulse occurring for one period during the time from time t34 to t35, and a missing negative pulse for one period during the time from time t3 to time t39. For such a synchronous detection signal K2, up until the time t33, at which the missing pulse occurs, the positive pulse complementary signal generator 51 and the negative pulse complementary signal generator 52 perform the processing described with reference to FIG. 15, generating the complementary signals K21 and K22 having positive and negative pulses existing in each period.

The complementary signal K21 generated by the positive pulse complementary signal generator 51 is output to the OR circuit 53, at which the logical sum is taken with the synchronous detection signal K2 so as to generate the complementary detection signal K23. The complementary signal K22 generated by the negative pulse complementary signal generator 52 is output to the AND circuit 54, at which the logical product is taken with the synchronous detection signal K2 so as to generate the complementary signal K24. These complementary signals K23 and K24 are output to the multiplexer 57. Because regular state changes occur in the synchronous detection signal K2 up until the time t33, the edge detection error signals e1 and e2 are not output from the P edge detector 55 and the N edge detector 56 (detecting step). For this reason, the synchronous detection signal K2 from the multiplexer 57 continues to be output as the complementary detection signal K25 until the time t33 (selecting step).

When the time t33 passes and the time t34 is reached, there is a missing positive pulse on the synchronous detection signal K2, but because the complementary signal K21 output from the positive pulse complementary signal generator 51 is generated based on the length of 1 period of the synchronous detection signal K2 and the positive pulse width, a positive pulse exists in the complementary signal K21 between time t34 and time t35. For this reason, the complementary detection signal K23 generated by the logical sum of the complementary signal K21 and the synchronous detection signal K2 also has a positive pulse between time t34 and time t35.

At time t34, because the synchronous detection signal K2 does not rise, the detection error signal e1 is output from the P edge detector 55 (detecting step). The multiplexer 57 outputs the complementary detection signal K23 as the complementary detection signal K25 from the point at which the detection error signal e1 is output until a half-period of the synchronous detection signal K2 elapses (selecting step). By the performing of this processing, as shown in FIG. 16, the complementary detection signal K25 is complemented for the missing positive pulse from time t34 to time t35.

From the time that t35 elapses until the time t38, because the synchronous detection signal K2 state changes regularly, the error detection signals e11 and e21 are not output from the P edge detector 55 and the N edge detector 56 (detecting step). For this reason, during this time the synchronous detection signal K2 continues to be output as is from the multiplexer 57 as the complementary detection signal K25 (selecting step).

During the time from time t38 to t39 (latter half-period), the synchronous detection signal K2 has a missing negative pulse. However, but because the complementary signal K22 output from the negative pulse complementary signal generator 52 is generated based on the length of 1 period of the synchronous detection signal K2 and the negative pulse width, a negative pulse exists in the complementary signal K22 between time t38 and time t39. For this reason, the complementary detection signal K22 generated by the logical sum of the complementary signal K22 and the synchronous detection signal K2 also has a negative pulse between time t38 and time t39.

After time t38 elapses, at the point that a half-period of the synchronous detection signal K2 elapses, because the synchronous detection signal K2 does not fall, the detection error signal e2 is output from the N edge detector 56 (detecting step). From the point at which the detection error signal e2 is output until the time of the half-period of the synchronous detection signal K2 elapses, the multiplexer 57 continues to output the complementary signal K24 as the complementary detection signal K25 (selecting step). By performing this processing, as shown in FIG. 16, the complementary detection signal K25 is complemented for the missing negative pulse between time t38 and time t39.

After the t39 elapses, because the synchronous detection signal K2 changes state regularly, the P edge detector 55 and the N edge detector 56 do not output the detection error signal e1 and the detection error signal e2 (detecting step). For this reason, the synchronous detection signal K2 is output as is from the multiplexer 57 as the complementary detection signal K25.

As described above, even if both a missing positive pulse and a missing negative pulse occur in the detection signal K1 (and by extension in the synchronous detection signal K2), the signal processing apparatus 50 of this embodiment can perform complete complementing thereof. Also, in this embodiment the P edge detector 55 and the N edge detector 56 set the edge detection regions A1 and A2, respectively, a shown in FIG. 14, and detect the rising and failing, respectively, of the synchronous detection signal K2. For this reason even in the case in which there is a sudden change in the positive pulse or the negative pulse of the synchronous detection signal K2, these are complemented as missing pulses. Therefore, this embodiment as well can complement sudden changes in pulse width.

The above is a description of the fourth embodiment of the present invention, and in this embodiment as well, similar to the third embodiment, it is possible to provide the same configuration, with the averaging processor 35 provided between the multiplexer 57 and the output terminal 12, so as to average the pulse width (time width) of the complementary detection signal K25.

In the fourth embodiment as well, it is possible to provide the synchronization section 21 immediately before the flag generator 22, and to input the asynchronous detection signal K1 as is to the OR circuit 30. In this case, the OR circuit 30 becomes an asynchronous circuit, and the complementary detection signal K4 output from the OR circuit 30 is also an asynchronous signal. Whether the asynchronous detection signal K1 is to be input to the OR circuit (asynchronous circuit) 30 as is or input to the OR circuit (synchronous circuit) 30 after generating the synchronous detection signal K2 can be detailed by considering the signal quality of the signal input to the input terminal T1 and tee delay period and the like of the complementary signal.

(Stage)

Next, a stage according to an embodiment of the present invention is described below.

Figure 17:
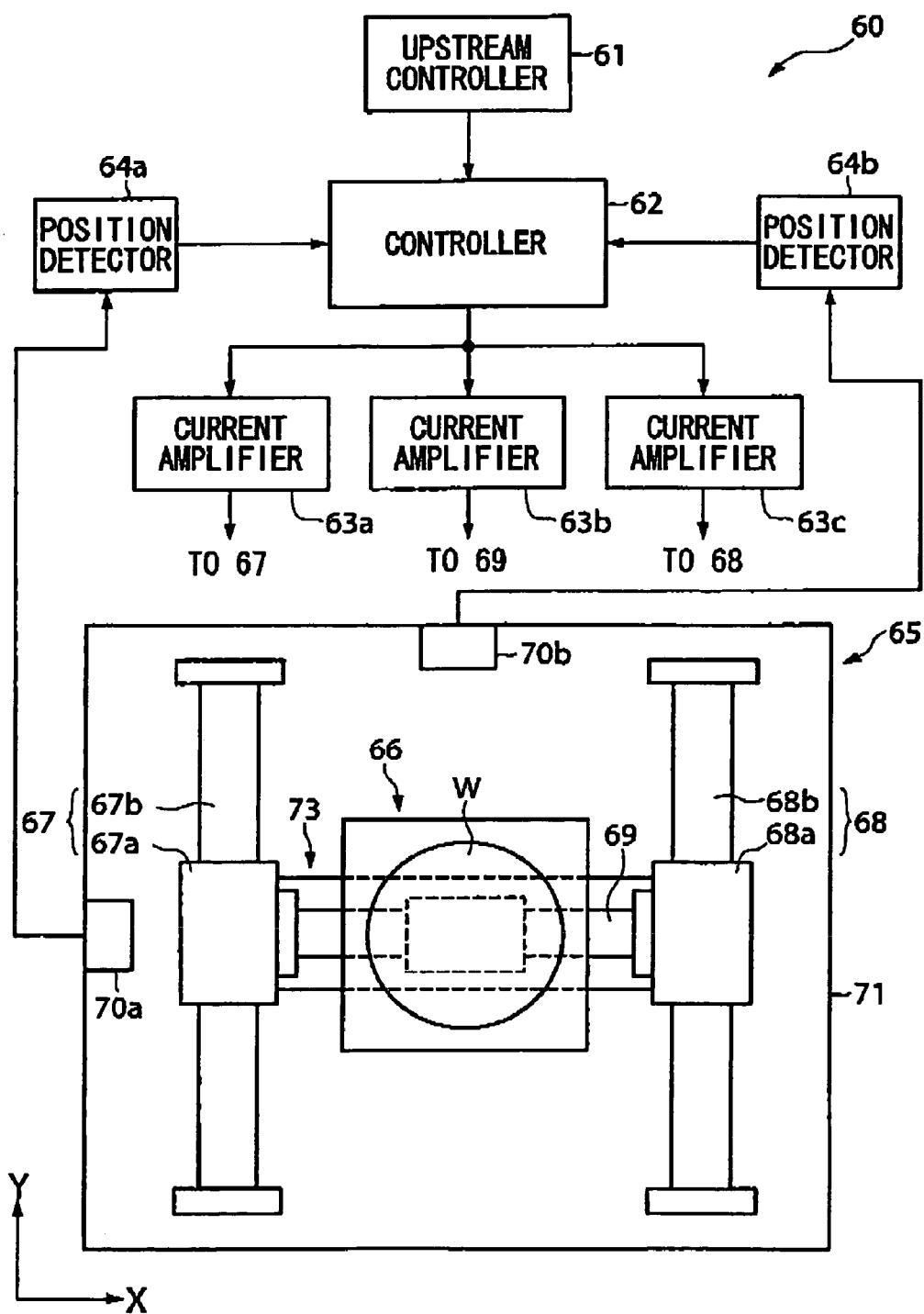
FIG. 17 is a drawing showing the general configuration of a stage according to an embodiment of the present invention.

FIG. 17 is a drawing showing the general configuration of a stage according to an embodiment of the present invention. The description of this stage will be presented with regard to the setting of the X axis and Y axis that are mutually perpendicular within the horizontal plane, within which a wafer W moves.

As shown in FIG. 17, the stage according to this embodiment has a stage part 65, which has a wafer stage 66 configured so as to be movable within the X-Y plane while holding the wafer W, and a controller 60, serving as a drive controller for the wafer stage 66. The controller 60 is configured so as to include an upstream controller 61, a controller 62, current amplifiers 63a to 63c, and position detectors 64a and 64b.

The upstream controller 61 outputs a control signal that instructs the controller 62 to move the wafer to a position within the X-Y plane. The controller 62, based on the control signal output from the upstream controller 61 and the detection signals output from the position detectors 64a and 64b, generates drive signals for the purpose of diving the linear motors 67 to 69 of the stage 65, so as to control the movement of the wafer stage 66 on which the wafer W is placed.

The current amplifiers 63a to 63c amplify the current of the drive signals output from the controller 62 by a prescribed amplification factor and supply them respectively to the linear motors 67 to 69 provided in the stage 65. The position detectors 64a and 64b perform the above-described signal processing on the detection signals output from laser interferometers 70a and 70b provided in the stage 65, and detect the X-direction position and the Y-direction position (stage position) of the wafer stage 66. In the stage apparatus shown in FIG. 17, the laser interferometers 70a and 70b correspond to the interferometer system as the term is used in the present invention.

Next, the stage 65 is described in detail below.

Figure 18:
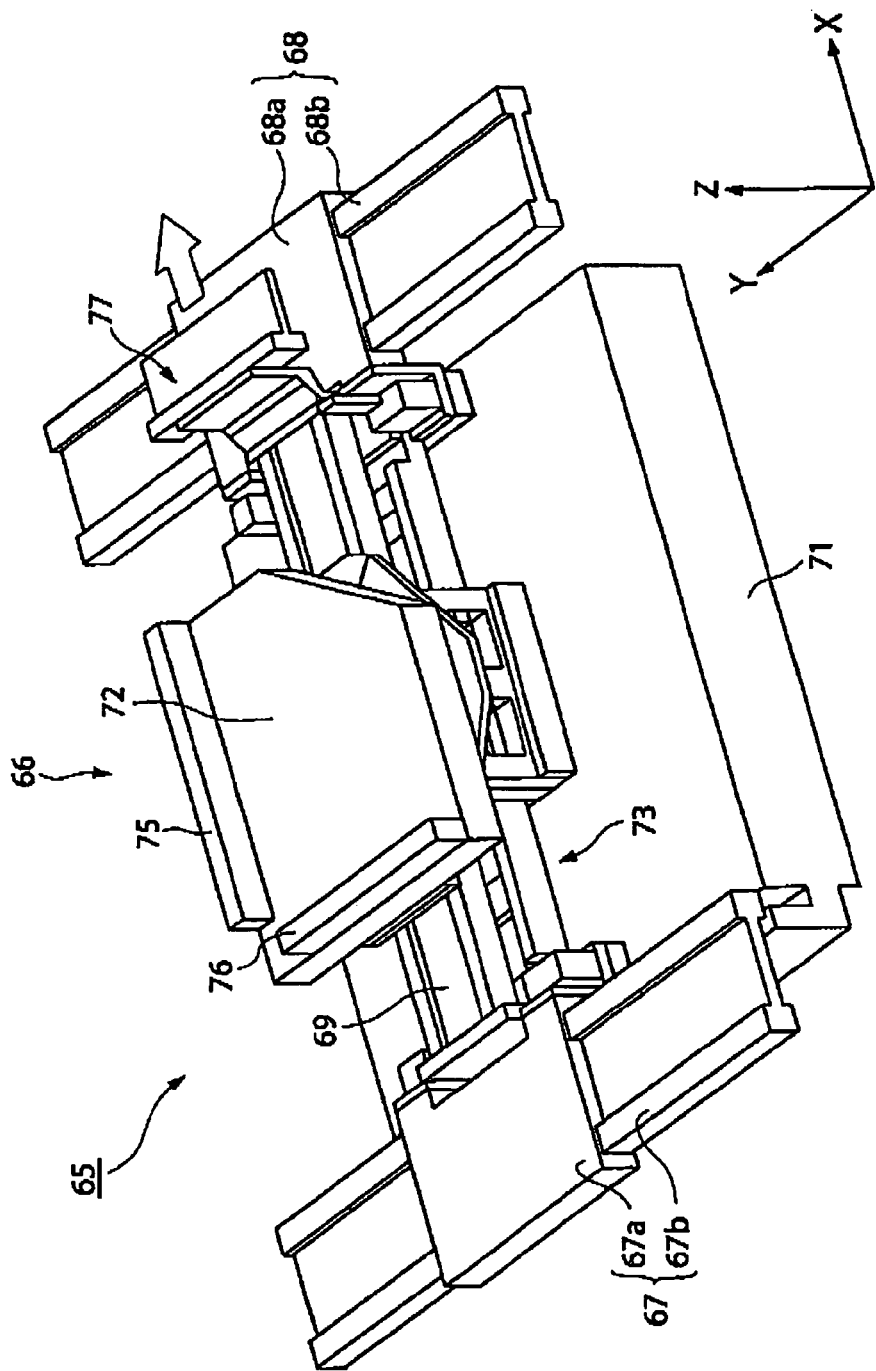
FIG. 18 is a perspective view showing an example of the configuration of a stage.

FIG. 18 is an oblique view showing an example of the configuration of the stage 65. As shown in FIG. 17 and FIG. 18, the stage 65 is mainly formed by the wafer stage 66, the wafer flat table 71 that supports the wafer stage 66 so that it can move in two dimensions within the X-Y plane, a sample holder 72 provided as one with the wafer stage 66 that vacuum chucks and holds the wafer W, and an X guide bar 73 supporting the wafer stage 66 and the sample holder 72 so as to allow their free relative movement. A plurality of non-illustrated non-contact type air bearings (air pads) is fixed to the lower surface of the wafer stage 66, the wafer stage 66 being floated above the wafer flat table 71 by these air bearings at via a clearance of, for example, several microns.

The wafer flat table 71 is supported over, for example a not-illustrated base plate, via a not-illustrated vibration-proof unit. The vibration-proof unit is configured, for example, to be disposed at each corner of the wafer flat table 71, and have air mounts with adjustable internal pressure in parallel with voice coil motors on the base plate. By means of these air mounts, the minute vibration reaching the wafer flat table 71 via the base plate is isolated to a level of micro-Gs.

As shown in FIG. 18, the X guide 73 extends lengthwise along the X direction, and has at both ends thereof in the length direction the moving pieces 68a and 68b, respectively, formed by armature units. The stators 67b and 68b having magnet units corresponding, respectively, to these moving pieces 67a and 68a are provided on supporting parts that are provided so as to protrude from the base plate, which is not illustrated.

A linear motor 67 is formed by the above-noted moving piece 67a and the stator 67b, and a linear motor 68 is formed by tee above-noted moving piece 58a and the stator 68b. The moving piece 67a is driven by the electromagnetic interaction with the stator 67b, and the moving piece 68a is driven by the electromagnetic interaction with the stator 68b, so that the X guide bar 73 moves in the Y direction and by adjust the amount of drive between the linear motor 67 and the linear motor 68, the wafer stage 66 rotated about the Z axis, which is perpendicular to the X axis and Y axis. That is, the linear motors 67 and 68 drives the wafer stage 66 (and the sample holder 72) substantially in concert with the X guide bar in the Y direction and about the X axis.

The moving piece of an X trim motor 77 is mourned on the X-direction side of the X guide bar 73. The X trim motor 77, by generating a thrusting force in the X direction, adjusts the X-direction position of the X guide bar 73, and the stator thereof is provided on the rear cushion frame, which is not illustrated. For this reason, it has the function of transmitting a repulsive force via the rear cushion frame to the base plate when the wafer stage 66 is driven in the X direction.

The sample holder 72 is supported and held so as to be freely relatively movable along the X guide bar 73, via a magnetic guide formed by a magnet and actuator, maintaining a prescribed gap with the X guide bar in the Z direction. The wafer stage 66 is driven in the X direction by the electromagnetic interaction with the linear motor 69, which has a stator that is buried in the X guide bar. The moving piece of the linear motor 69, although not illustrated, is mounted to the wafer stage 66. The wafer W is vacuum chucked to the upper surface of the sample holder 72 via wafer holder, which is not illustrated.

The linear motor 69 is disposed more closely to the wafer W resting on the wafer stage 66 than the above-noted linear motors 67 and 68, and the moving piece of the linear motor 69 is fixed to the sample holder 72. For this reason, it is desirable to use a moving magnet type of linear motor, in which the coil of the linear motor 69, which is a heat source serve as a stator, is moved away from the wafer W and is fixed directly to the sample holder 72.

Because the linear motors 67 and 68 drive the linear motor 69, the X guide bar 73, and the sample holder 72 in concert, they must have much more propelling force than the X linear motor 69. For this reason, they require a large amount of electrical power, and the amount of heat generated is greater than that of the linear motor 69. It is therefore desirable that the linear motors 67 and 68 be moving coil type linear motors.

A moving mirror 75 extending in the X direction and a moving mirror 76 extending in the Y direction are mounted to the end part of the wafer stage 66. The laser interferometers 70b and 70a (refer to FIG. 1) are mounted, respectively, to the surfaces of the moving mirrors 75 and 76 at opposing positions, and the results of measurements by the laser interferometers 70a and 70b are output to 64a and 64b, are subjected to the above-described signal processing, and the X-direction position and Y-direction position of the wafer stage 66 are measured in real time with a resolution of, for example, 0.5 to 1 nm. Also, at least one of the laser interferometers 70a and 70b is a multi-axis interferometer having at least 2 measurement axes and, based on the values measured by these laser interferometers, not only the X-direction position and Y-direction position of the wafer stage 66 (and by extension the wafer W), but also the amount of rotation about the Z axis and amount of leveling can be determined.

(Exposure Apparatus)

Next, an exposure apparatus is described in detail below.

Figure 19:
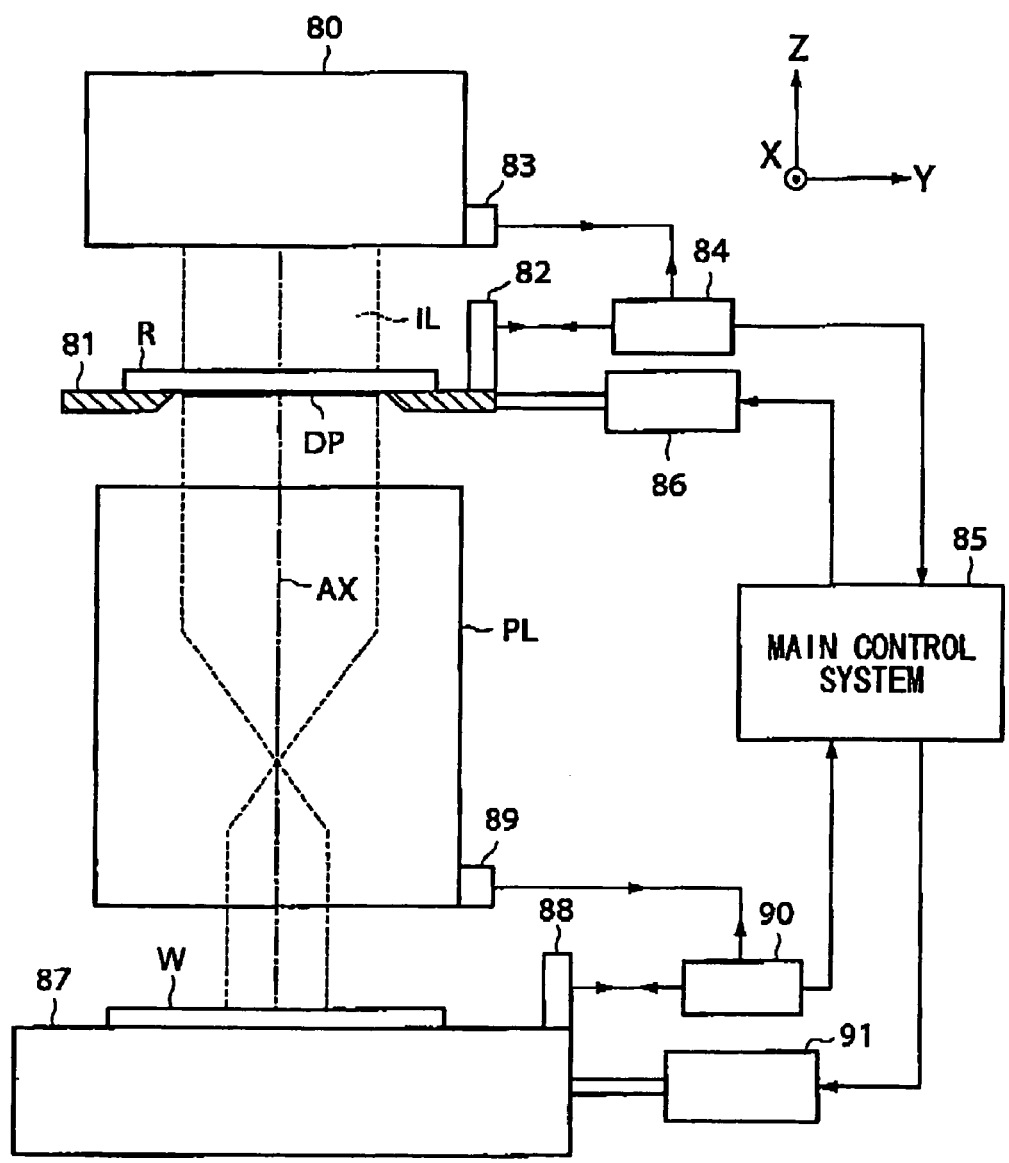
FIG. 19 is a drawing showing the general configuration of an exposure apparatus.

FIG. 19 is a drawing showing the general configuration of an exposure apparatus.

The exposure apparatus shown in FIG. 19 is a so-called step-and-scan exposure apparatus, in which a reticle R and a wafer W are caused to move synchronously as a pattern image formed on the reticle R is sequentially transferred onto the wafer W. In FIG. 19, the reference numerals 80 denotes an illumination optics system that has a light source such as an ultra-high pressure mercury lamp that emits light at a g line (wavelength of 436 nm) and an i line (wavelength of 365 nm), an excimer laser (wavelength of 248 nm), an ArF excimer laser (wavelength of 193 nm), or an $F_2$ laser (wavelength of 157 nm), wherein the intensity distribution of the light emitted from these sources being made uniform, and the light therefrom is formed into an illumination light IL having a prescribed shape.

The reference numerals 81 denotes a reticule stage onto which the reticule R is placed as a mask, which can be moved by a snail amount in the light axis AX direction of the projection optics system PL, and which can move in two dimensions and rotated by a small amount with a plane that is perpendicular to the light axis AX. A moving mirror 82 is mounted to one end of the reticule stage 81, and a laser interferometer 84 is disposed at a position that is opposite the mirror surface of the moving mirror 82. A fixed mirror 83 is also mounted to the illumination optics system 80. The fixed mirror 83 can also be mounted to the projection optics system PL.

The laser interferometer 84 directs laser light having a wavelength of $\lambda 1$ onto the moving mirror 82, directs laser light having a wavelength of $\lambda 2$, which is different from the wavelength of the line stirring the moving mirror 82, onto the fixed mirror 83, and causes interference between the reflected lights, detecting the thus-obtained interference light to obtain a detection signal. Inside the laser interferometer 84 a light path similar to the reference light path P1 shown in FIG. 1 is provided, the laser lights of wavelengths $\lambda 1$ and $\lambda 2$ passing along this light path and interfering so as to obtain a reference signal.

After digitizing the reference signal and the detection signal, the laser interferometer 84 performs glitch reduction processing, and further performs the above-described signal processing to generate the reference signal S1 and the detection signals S2 and S3, comparing the reference signal S1 with the detection signal S2 and comparing the reference signal S1 with the detection signal S3 so as to measure the X-axis coordinate, the Y-axis coordinate, and the rotation angle of the reticule stage 81. If the reticule stage is considered to be the object under measurement OB shown in FIG. 1, the laser interferometer 84 corresponds to the interferometer system shown in FIG. 1.

Although it showed in simplified form in FIG. 19, the moving mirror 82 is formed by a moving mirror having a mirror surface perpendicular to the X axis and a moving minor having a minor surface perpendicular to the Y axis. The laser interferometer 84 is formed by an laser interferometer for the Y axis which directs a laser beam along the Y axis onto the moving mirror moving minor 82, and a laser interferometer for the X axis which directs a laser beam along the X axis onto the moving mirror moving mirror 82, the laser interferometer formed by the one laser interferometer for the Y axis and the one laser interferometer for the X axis measuring the X axis and Y axis coordinates the reticule stage 81. From the difference in measured values between the two laser interferometers for the Y axis the rotation angle of the reticule stage 81 is measured. The information of the X and Y coordinates and rotation angle of the reticule stage 81 detected by the laser interferometer 84 is supplied to the main control system 85. The main control system 85 monitors the stage position information it is supplied as it outputs a control signal to the drive system 86, so as to control the positioning operation of the reticule stage 81.

A device pattern DP for semiconductor devices or liquid-crystal elements or the like is formed on the reticule R placed on the reticule stage 81 by chromium or the like on the surface of a transparent glass substrate. When the illumination light IL emitted from the illumination optics system 80 strikes the reticule R, the image of the device pattern formed on the reticule R is transferred onto the wafer W via the projection optics system PL. The surface of the reticule R onto which the device pattern is formed (pattern surface) and the surface of the wafer W are designed to be optically conjugate with respect to the projection optics system PL.

The wafer stage 87 is formed from elements including an XY stage that moves the wafer W within the X-Y plane, a Z stage that moves the wafer W in the Z-axis direction, a stage that causes rotation of the wafer W within the X-Y plane, and a stage that adjusts the tilt of the wafer W with respect to the X-Y plane by changing the angle with respect to the Z axis. A moving mirror 88 having a length greater than the amount of travel of the wafer stage 87 is mounted to one end of the upper surface of the wafer stage 87, and a laser interferometer 90 is disposed at a position that opposes the mirror surface of the moving mirror 88. A fixed mirror 89 is mounted to the above-described projection optics system PL.

The laser interferometer 90 directs laser light having a wavelength of $\lambda 1$ onto the moving mirror 88, and directs laser light having a wavelength of $\lambda 2$, which is different from the light striking the moving mirror 88, onto the fixed mirror 89, causes interference between each of the reflected lights and detect the interference light so as to obtain a detection signal. A light path similar to the reference light path P1 is provided within the laser interferometer 90, the laser lights of wavelengths $\lambda 1$ and $\lambda 2$ passing along this light path and interfering so as to obtain a reference signal.

After digitizing the reference signal and the detection signal the laser interferometer 90 performs glitch reduction processing, and further performs the above-described signal processing to generate the reference signal S1 and the detection signals S2 and S3, comparing the reference signal S1 with the detection signal S2 and comparing the reference signal S1 with the detection signal S3 so as to measure the X-axis coordinate, the Y-axis coordinate, and the rotation angle of the wafer stage 87. If the wafer stage 87 is considered to be the object under measurement OB shown in FIG. 1, the laser interferometer 90 corresponds to the interferometer system shown in FIG. 1.

Although shown in simplified form in FIG. 19, the moving mirror 88 is formed by a moving mirror having a mirror surface perpendicular to the X axis and a moving mirror having a mirror surface perpendicular to the Y axis. The laser interferometer 90 is formed by a laser interferometer for the Y axis which directs a laser beam along the Y axis onto the moving mirror moving mirror 88, and a laser interferometer for the X axis which directs a laser beam along the X axis onto the moving mirror moving mirror 88, the laser interferometer formed by the one laser interferometer for the Y axis and the one laser interferometer for the X axis measuring the X axis and Y axis coordinates the wafer stage 87. From the difference in measured values between the two laser interferometers for the Y axis the rotation angle of the wafer stage 87 is measured. The information of the X and Y coordinates and rotation angle of the wafer stage 87 detected by the laser interferometer 90 is supplied to the main control system 85. The main control system 85 monitors the stage position information it is supplied as it outputs a control signal to the drive system 91, so as to control the positioning operation of the wafer stage 87.

When the image of the device pattern DP formed on the reticule R is transferred onto the wafer W, first the main control system 85 uses a reticule alignment system, which is not illustrated, to measure the accurate position information of the reticule R and, after measure of the accurate position information of the wafer W using the wafer alignment system, the relative position of the reticule R and the wafer W are adjusted, based on these measurement results and the measurement results form the laser interferometer 84 and the laser interferometer 90. Next, a control signal is output to the drive system 86 and the drive system 90, and the movement of the reticule R and the wafer W is started, with a slit-shaped illumination light IL shined onto the reticule R. After that, the detection results from the laser interferometer 84 and the laser interferometer 90 are monitored as the reticule R and the wafer W are moved synchronously to successively transfer the device DP onto the wafer W.

Although the foregoing describes embodiments of the present invention, the present invention is not restricted to the above-noted embodiments, and can be change freely within the scope of the invention. For example, in an above-mentioned embodiment with respect to a detection signal K1 input to the input terminal T1 of the signal processing apparatus 20, a complementary signal K3 that is delayed by just 1 period relative to the detection signal K1 is generated and a logical sum of the detection signal K1 and the complementary signal K3 is calculated to generate tee complementary detection signal K4. However, it is also possible to make the delay time of the complementary signal K3 with respect to the detection signal K1 a plurality of periods of the detection sign K1.

Additionally, in an above-described embodiment the interferometer system using the signal processing of the present invention is used to measure the position information of the object under measurement (stage) in one dimension or two dimensions. However, as disclosed in Japanese Unexamined Patent Application, First Publication Nos. H11-97982 and 2000-49066, and in Published Japanese Translation No. 2001-513267 of the PCT International Publication, application is also possible in the case of using an interferometer system for the purpose of determining the position information or rotation and tilt or the like of an object under measurement.

Also, while the description of the above-noted embodiment was presented for the example of a step-and-scan type exposure apparatus, the present invention can be applied also to a step-and-repeat type exposure apparatus. The light source provide in the illumination optics system 80 of the exposure apparatus of the above-noted embodiment is not limited to an ultra-high pressure mercury lamp, a KrF excimer laser, an ArF excimer laser light, or an $F_2$ laser light (wavelength of 157 nm), but can also use a charged particle beam, such as X-rays or an electron beam. For example in the case of an electron beam, it is possible to use a thermionic emission type lanthanum hexaboride, or tantalum. Additionally, in an above-described embodiment, the example described is one of manufacturing semiconductor devices or liquid-crystal elements, it will be understood that the present invention can also be applied to an exposure apparatus used to transfer a device pattern used in the manufacturing of thin-film magnetic heads, or to an exposure apparatus or the like used in manufacturing imaging elements such as CCDs or the like.

Additionally, it is possible to as a light source light in the red region emitted from a DFB semiconductor laser or a fiber laser, or a single-wavelength laser light in the visible light region, for example, amplifying same with, for example, a fiber amplifier doped with erbium (for example with both erbium and yttrium), or a harmonic waveform obtained by wavelength conversion of ultraviolet light using a non-linear optical crystal. For example, if the oscillation wavelength of a single-wavelength laser is in the range of 1.51 to 1.59 μm, an eighth harmonic wavelength in the range of 189 nm to 199 nm or a tenth harmonic wavelength in the range of 151 nm to 159 nm is output.

In particular, if the oscillation wavelength is made to be in the range of 1.544 to 1.553 μm, an eighth harmonic wavelength in the range of 193 to 194 nm, that is, ultraviolet light of almost the same wavelength as an ArF excimer laser light, is obtained, and if the oscillation wavelength is made to be in the range of 1.57 to 1.58 nm, a tenth harmonic wavelength in the range of 157 to 158 nm, that is, ultraviolet light of almost the same wavelength as an $F_2$ laser light is obtained. If the oscillation wavelength is made to be in the range of 1.03 to 1.12 μm, a seventh harmonic wavelength in the range of 147 to 160 nm is output, and in particular if the oscillation wavelength is made to be in the range of 1.099 to 1.106 μm, a seventh harmonic waveform in the range from 157 to 158 nm is obtained, this being ultraviolet light of almost the same wavelength as an F2 laser light. In this case, it is possible to use, for example, a yttrium doped fiber laser as the single-wavelength laser.

The preset invention is not restricted to use in an exposure apparatus used in manufacturing semiconductor devices, and can also be applied to an exposure apparatus that transfers a device pattern onto a glass plate used for manufacturing displays, including liquid crystal displays (LCDs), an exposure apparatus that transfers a device pattern onto a ceramic wafer used for manufacturing thin-film magnetic heads, and an exposure apparatus used in the manufacturing of imaging devices such as CCDs and the like. The present invention is further applicable to an exposure apparatus that transfers a circuit pattern onto a glass substrate or silicon wafer or the like for manufacturing a reticule or mask used in optical exposure apparatuses, EUV exposure apparatuses, X-ray exposure apparatuses, and electron beam exposure apparatuses. In an exposure apparatus using DUV (deep ultraviolet) light or VUV (vacuum ultraviolet) light, a transmission type reticule is generally used, with quartz glass, fluorine-doped quartz glass, fluorite, magnesium fluoride, or quartz or the like used as the reticule substrate. In a proximity type X-ray exposure apparatus or electron beam exposure apparatus, a transmission type mask is used (stencil mask or membrane mask), and a silicon wafer or the like is used as the mask substrate.

The stage of the present invention can be applied not only to a reticule stage or wafer stage provided in an exposure apparatus, but can also be applied to the general case in which a stage apparatus is controlled so as to move the stage while holding an object (with no restriction to one-dimensional or two-dimensional movement).

Figure 20:
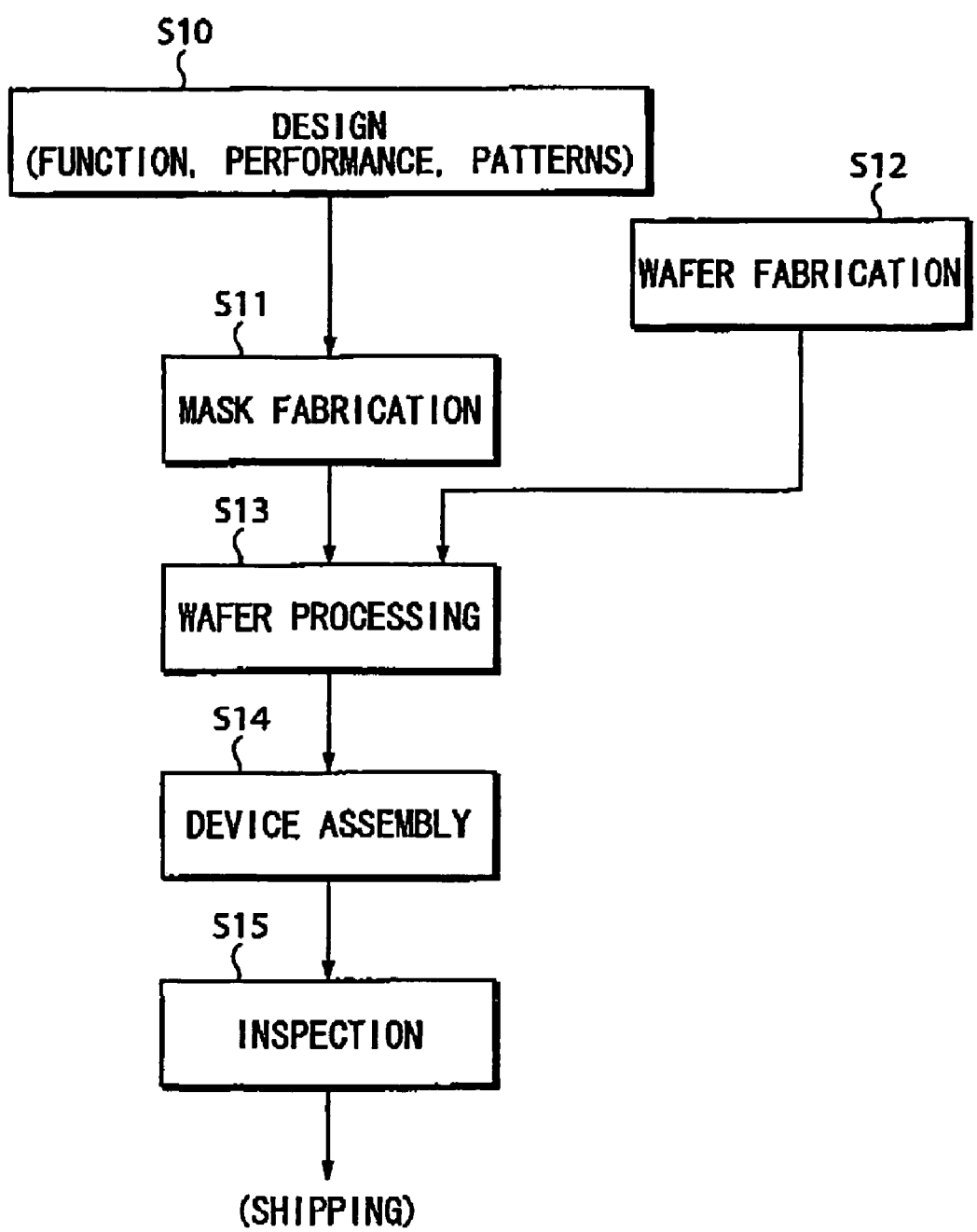
FIG. 20 is a flowchart showing an example of the manufacturing processes for a microdevice.

Next, an embodiment of a method for manufacturing in a microdevice using a lithographic process with the above-described exposure apparatus is described. FIG. 20 is a drawing showing a flowchart of an example of manufacturing a microdevice (such as semiconductor chips for an IC or LSI device, a liquid-crystal panel, a CCD, a thin-film magnetic head, or a micromachine or the like). As is shown in FIG. 20, first, at step S20 (designing step), the functional and performance design (for example, design of a semiconductor circuit) is performed, and the pattern to implement those functions is designed. Next, at step S11 (mask manufacturing step), a (reticule) having formed on it the designed circuit pattern is fabricated. At step S12 (wafer fabrication step), silicon or other material is used to manufacture the wafer.

Next, at step S13 (wafer processing step), the mask and reticule prepared at steps S10 through S12 are used, as described below, to form an actual circuit or the like onto a wafer, using a lithography technique. Then, at step S14 (device assembling step), the wafer processed at step S13 is used to perform device assembly. This stop S14 includes dicing, bonding, and packing process steps (chip sealing) as required. Finally, at step S15 (inspecting step), an inspection is performed as an operational verification and life test and the like of the microdevice manufactured at step S14. After passing through these process steps, the microdevice is completed and is shipped.

Figure 21:
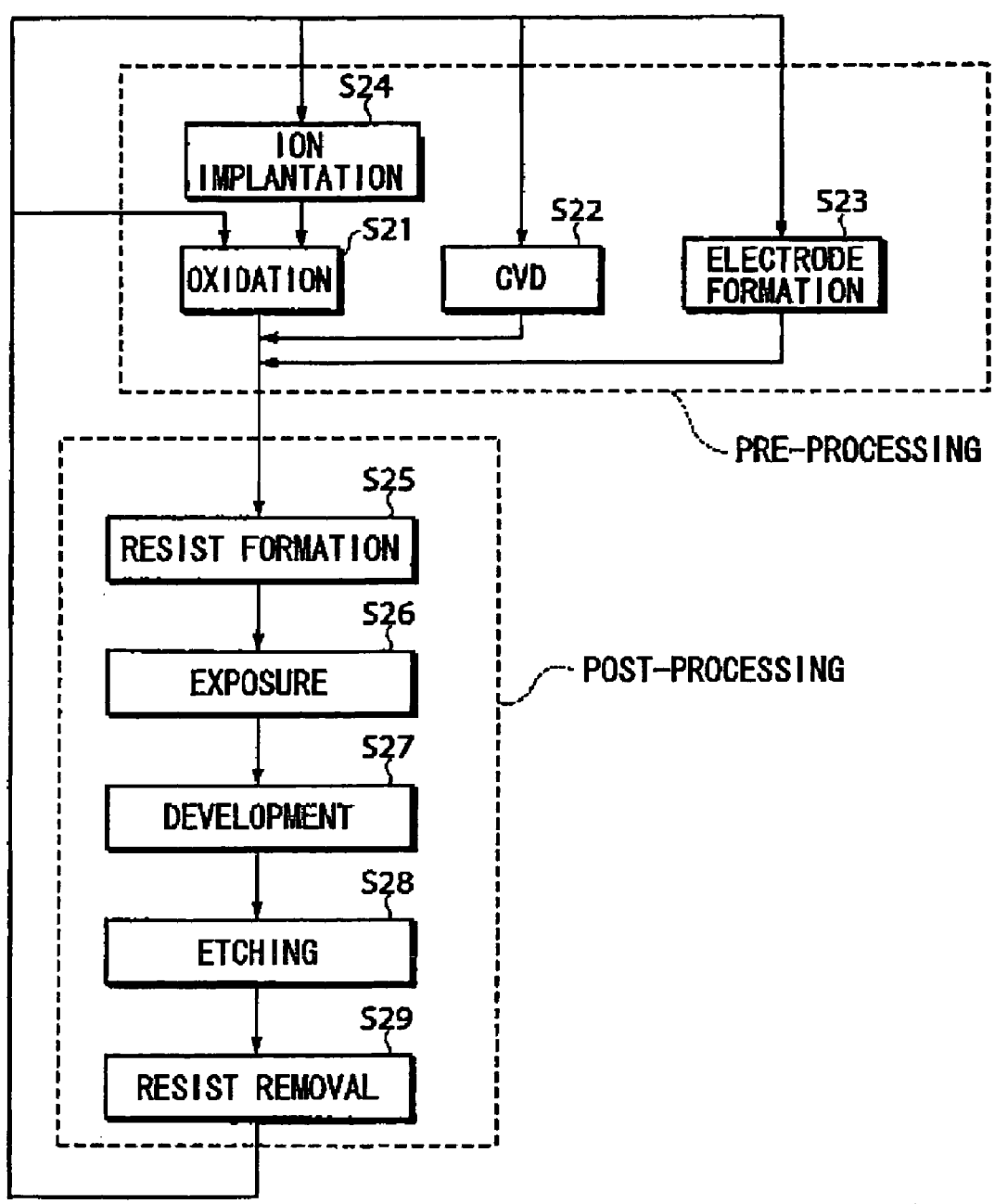
FIG. 21 is a drawing showing an example of the detailed flow for the example of a semiconductor device.

FIG. 21 is a drawing showing an example of the detailed flow of step 813 in FIG. 20.

In FIG. 21, the wafer surface is oxidized at step S21 (oxidizing step). At step S22 (CVD step) an insulating layer is formed on the wafer surface. At step S23 (electrode forming step), electrodes are formed by deposition onto the wafer. At step S24 (ion implanting step), the wafer is subjected to ion implantation. Each of the above-noted steps S21 through S24 is a pre-processing step of the wafer processing, and the required processing is selectively performed at each of the steps.

At each step in the wafer process, when the above pre-processing is completed, the post-processing described below is performed. In this post-processing, first, at step S25 (resist forming step) photosensitive material is applied to the wafer. Next, at step S26 (exposing step) the circuit pattern is transferred to the wafer using the above-described lithography system (exposure apparatus) and exposure method. Next, at step S27 (developing step) the exposed wafer is developed and at step S28 (etching step) the exposed parts in parts other than those in which the resist are removed by etching. Then, at step S29 (resist removing step) the etching is completed and unneeded resist is removed. By repeating these pre-processing and post-processing steps, the multiple circuit pattern is formed on the wafer.

In the above-described microdevice manufacturing method, because in the exposing step (step S26) the above-described signal processing method is used to measure the position information of the mask and the wafer with high accuracy, it is possible to achieve a further improvement in the accuracy overlaying patterns onto the wafer on which a pattern has already been formed and, as a result, it is possible to product a device with a high degree of integration and a minimum line width of approximately 0.1 μm with good yield.

There is no restriction of application of the present invention to microdevices such as semiconductor elements, the present invention being applicable also to an exposure apparatus which transfers a circuit pattern from a mother reticle to a glass substrate or silicon wafer, for the purpose of fabricating a reticle or mask that is used in an optical exposure apparatus, an EUV exposure apparatus, an X-ray exposure ads, or an electron beam exposure apparatus. In an exposure apparatus using DIN (deep ultraviolet light) or VUV (vacuum ultraviolet) light, a transmission type reticle is generally used, with quark glass, fluorine-doped quartz glass, fluorite, magnesium fluoride, or quartz or the like used as the reticle substrate. In a proximity type X-ray exposure apparatus or electron beam exposure apparatus, a mission type mask is used (stencil mask or membrane mask), and a silicon wafer or the like is used as the mask substrate. Such an exposure apparatus is disclosed, for example, in PCT International Publication Nos. WO99/66370, WO99/50712 and WO99/66370, and in Japanese Unexamined Patent Application, First Publication Nos. H11-194479, 2000-12453 and 2000-29202.

What is claimed is:

1. A method for processing a signal in an interferometer system that measures position information of an object under measurement based on reflected light obtained by directing a measurement light onto said object under measurement, comprising:
   obtaining a delayed signal by causing a delay of a prescribed number of periods with respect to a prescribed signal;
   obtaining a synthesized signal of said prescribed signal and said delayed signal; and
   measuring position information of said object under measurement using said synthesized signal.

2. A method for processing a signal in an interferometer system according to claim 1, further comprising slightly reducing a time width of said delayed signal.

3. A method for processing a signal in an interferometer system according to claim 1, further comprising of averaging a time width of said synthesized signal.

4. A method for processing a signal in an interferometer system according to claim 1, wherein said prescribed signal is a detection signal obtained by detecting an interference light that is generated by causing interference between said reflected light and a reference light.

5. A method for processing a signal in an interferometer system according to claim 1, wherein said prescribed signal, in order to obtain position information of said object under measurement; is a reference signal that is compared with a detection signal obtained by detecting an interference light that is generated by causing interference between said reflected light and a reference light.

6. A stage comprising:
   a moving body configured so as to be movable in a prescribed direction;
   an interferometer system using a method for processing a signal according to claim 1 to measure position information of said moving body as an object under measurement; and
   a drive controller that drives said moving body based on a measurement result from said interferometer system.

7. A method for processing a signal in an interferometer system that measures position information of an object under measurement based on reflected light obtained by directing a measurement light onto said object under measurement, comprising:
   a first step of digitizing a prescribed signal;
   a second step of delaying said prescribed signal digitized by the first step by a prescribed number of periods to obtain a delayed signal;
   a third step of logically synthesizing said prescribed signal digitized by the first step and said delayed signal; and
   a fourth step of using said signal obtained by logical synthesis in the third step to obtain position information of said object under measurement.

8. A method for processing a signal in an interferometer system according to claim 7, wherein said second step comprises:
   a fifth step of measuring the period and the pulse width of said prescribed signal digitized by the first step for each period; and
   a sixth step of, after measurement at each period, obtaining said delayed signal based on the period and pulse width measured at a previous period.

9. A method for processing a signal in an interferometer system according to claim 7, wherein said second step includes a step of obtaining as said delayed signal a first delayed signal by causing delay by said prescribed number of periods, based on a rising edge of said digitized prescribed signal and a second delayed signal by causing delay by said prescribed number of periods, based on a falling edge of said digitized prescribed signal.

10. A method for processing a signal in an interferometer system according to claim 9, wherein said third step comprises:
- a step of calculating the logical sum of said prescribed signal digitized by said first step and said first delayed signal; and
- a step of calculating the logical product of said prescribed signal digitized by said first step and said second delayed signal.

11. A method of processing a signal in an interferometer system according to claim 10, further comprising:
- a step of detecting the existence or non-existence of the rising edge and the falling edge in said prescribed signal digitized by said first step; and
- a step of, in response to a detection result of said detecting step, selecting one of said prescribed signal digitized by said first step, said signal obtained by calculating the logical sum, and said signal obtained by calculating the logical product.

12. A method for processing a signal in an interferometer system according to claim 11, wherein said detecting step detects existence or non-existence of the rising edge and the falling edge in said prescribed signal digitized by said first step within a prescribed time width.

13. A method for processing a signal in an interferometer system according to claim 7, further comprising a seventh step of reducing the pulse width of each pulse forming said delayed signal.

14. A method for processing a signal in an interferometer system according to claim 7, wherein said prescribed signal is a detection signal obtained by detecting an interference light that is generated by causing interference between said reflected light and a reference light.

15. A method for processing a signal in an interferometer system according to claim 7, wherein said prescribed signal, in order to obtain position information of said object under measurement, is a reference signal that is compared with a detection signal obtained by detecting an interference light that is generated by causing interference between said reflected light and a reference light.

16. A method for processing a signal in an interferometer system according to claim 7, wherein said prescribed signal, in order to obtain position information of said object under measurement, is a reference signal performing a comparison with a detection signal obtained by causing interference between said reflected light and a reference light and detecting the interference light.

17. A stage comprising:
- a moving body configured so as to be movable in a prescribed direction;
- an interferometer system using a method for processing a signal according to claim 6 to measure position information of said moving body as an object under measurement; and
- a drive controller that drives said moving body based on a measurement result from said interferometer system.

18. An interferometer system comprising:
- a reference mechanism that outputs a reference signal; and
- a receiver that outputs a detection signal obtained by causing interference between reflected light obtained by directing a measurement light onto said object under measurement and a reference light,
- wherein said reference mechanism performs complementing processing of a digitally processed signal and outputs said signal as said reference signal after said complementing processing, and
- wherein position information of said object under measurement is measured based on said reference signal obtained from said reference mechanism and said detection signal from said receiver.

19. An interferometer system according to claim 18, wherein said receiver comprises a means, in order to perform complementing processing, for delaying that delays said digitally processed signal by a prescribed number of periods.

* * * * *